(12) United States Patent
Hannan et al.

(10) Patent No.: US 9,944,216 B2
(45) Date of Patent: Apr. 17, 2018

(54) AUTOMATED SOFT TONNEAU COVER

(71) Applicant: BOS Automotive Products, Inc., Rochester Hills, MI (US)

(72) Inventors: Mickey Alan Hannan, Shelby Township, MI (US); Andrew Charles Stewart, Lake Orion, MI (US); Juergen Josef Salewski, Rochester Hill, MI (US); Michael David Uhazie, Oakland Township, MI (US); Huan Tran, Ostfildern (DE); Markus Hintennach, Baltmannsweiler (DE)

(73) Assignee: BOS AUTOMOTIVE PRODUCTS, INC., Rochester Hills, MI (US)

( * ) Notice: Subject to any disclaimer, the term of this patent is extended or adjusted under 35 U.S.C. 154(b) by 0 days.

(21) Appl. No.: 15/042,374

(22) Filed: Feb. 12, 2016

(65) Prior Publication Data
US 2016/0236551 A1 Aug. 18, 2016

Related U.S. Application Data

(60) Provisional application No. 62/220,412, filed on Sep. 18, 2015, provisional application No. 62/220,416, (Continued)

(51) Int. Cl.
*B60P 7/04* (2006.01)
*B60J 7/06* (2006.01)

(52) U.S. Cl.
CPC .............. *B60P 7/04* (2013.01); *B60J 7/067* (2013.01); *B60J 7/068* (2013.01)

(58) Field of Classification Search
CPC ... B60J 7/061; B60J 7/062; B60J 7/067; B60J 7/068; B60J 7/085; B60P 7/04; E06B 9/58
(Continued)

(56) References Cited

U.S. PATENT DOCUMENTS

| 1,627,716 A | 5/1927 | Teachout | |
| 1,718,183 A * | 6/1929 | Smith | B60J 7/02 160/272 |

(Continued)

FOREIGN PATENT DOCUMENTS

| EP | 0427677 A1 | 5/1991 |
| EP | 0834414 A2 | 4/1998 |

(Continued)

OTHER PUBLICATIONS

Non-Final Office Action from U.S. Appl. No. 15/013,352, filed Feb. 2, 2016.

(Continued)

*Primary Examiner* — Jason S Daniels
(74) *Attorney, Agent, or Firm* — Carlson, Gaskey & Olds, P.C.

(57) ABSTRACT

A retractable cover system includes a frame that provides an opening and includes laterally spaced apart guide rails and includes a drive system. A flexible cover has laterally opposing edge portions with intermittent retainers received in the guide rails. The retainers are configured to slide relative to the guide rails between first and second positions within the opening in response to actuation of the drive system. Multiple spaced apart bows extend laterally between guide rails. The bows provide a laterally and outwardly extending arc that maintains tension on the flexible cover laterally between the retainers.

14 Claims, 24 Drawing Sheets

Related U.S. Application Data filed on Sep. 18, 2015, provisional application No. 62/220,420, filed on Sep. 18, 2015, provisional application No. 62/115,720, filed on Feb. 13, 2015, provisional application No. 62/115,710, filed on Feb. 13, 2015, provisional application No. 62/115,772, filed on Feb. 13, 2015.

(58) Field of Classification Search
USPC ...... 296/98, 100.01, 100.11, 100.12, 100.15, 296/100.17, 100.18, 136.03
See application file for complete search history.

(56) References Cited

U.S. PATENT DOCUMENTS

| | | | |
|---|---|---|---|
| 1,969,595 A * | 8/1934 | D Ornellas | B60J 7/067 296/98 |
| 3,488,087 A | 1/1970 | Cox | |
| 4,210,361 A | 7/1980 | Marvin et al. | |
| 4,563,034 A | 1/1986 | Lamb | |
| 4,611,848 A | 9/1986 | Romano | |
| 4,634,172 A | 1/1987 | Duda | |
| 4,786,099 A | 11/1988 | Mount | |
| 4,792,178 A | 12/1988 | Kokx | |
| 4,889,381 A | 12/1989 | Tamblyn et al. | |
| 4,923,240 A | 5/1990 | Swanson | |
| 5,040,843 A | 8/1991 | Russell et al. | |
| 5,096,250 A | 5/1992 | Menz | |
| 5,121,960 A | 6/1992 | Wheatley | |
| 5,301,995 A | 4/1994 | Isler | |
| 5,330,246 A | 7/1994 | Bernardo | |
| 5,375,900 A | 12/1994 | Tessenyi et al. | |
| 5,758,921 A | 6/1998 | Hall | |
| 5,909,921 A | 6/1999 | Nesbeth | |
| 6,000,740 A | 12/1999 | Hall et al. | |
| 6,030,021 A | 2/2000 | Ronai | |
| 6,053,556 A | 4/2000 | Webb | |
| 6,126,226 A | 10/2000 | Wheatley | |
| 6,217,102 B1 | 4/2001 | Lathers | |
| 6,224,138 B1 | 5/2001 | Adsit et al. | |
| 6,234,561 B1 | 5/2001 | Huotari | |
| 6,276,735 B1 | 8/2001 | Champion | |
| 6,309,005 B1 | 10/2001 | Priest et al. | |
| 6,315,346 B1 | 11/2001 | Martin | |
| 6,322,129 B2 | 11/2001 | Huotari | |
| 6,416,103 B1 | 7/2002 | Laudenbach et al. | |
| 6,527,331 B2 | 3/2003 | Searfoss | |
| 6,568,739 B1 | 5/2003 | Burch | |
| 6,582,007 B2 | 6/2003 | Gothier et al. | |
| 6,623,062 B1 | 9/2003 | Hoffman | |
| 6,719,353 B1 | 4/2004 | Isler et al. | |
| 6,830,281 B2 | 12/2004 | Hoffman | |
| 6,846,032 B2 | 1/2005 | de Gaillard et al. | |
| 6,893,072 B1 | 5/2005 | Graves | |
| 6,929,303 B1 | 8/2005 | Sharples | |
| 6,948,760 B2 | 9/2005 | Marx et al. | |
| 7,275,779 B2 | 10/2007 | Hebron | |
| 7,384,090 B1 | 6/2008 | Weldy | |
| 7,513,562 B2 | 4/2009 | Hardy et al. | |
| 7,530,614 B2 | 5/2009 | Nichols | |
| 7,568,752 B1 | 8/2009 | Lin | |
| 7,815,239 B1 | 10/2010 | Schmeichel et al. | |
| 7,946,643 B2 | 5/2011 | Getschel et al. | |
| 8,186,739 B2 | 5/2012 | Bruestle et al. | |
| 8,308,218 B2 | 11/2012 | Kneifl et al. | |
| 8,424,951 B1 | 4/2013 | Martin | |
| 8,523,266 B2 | 9/2013 | Yue | |
| 8,657,358 B2 | 2/2014 | Garska | |
| 8,672,388 B2 | 3/2014 | Rusher et al. | |
| 8,702,151 B2 | 4/2014 | Mayfield et al. | |
| 8,746,321 B2 | 6/2014 | Miller | |
| 8,777,293 B2 | 7/2014 | Garska | |
| 8,807,624 B2 | 8/2014 | Garska | |
| 8,807,625 B2 | 8/2014 | Garska | |
| 9,266,416 B1 | 2/2016 | Nania | |
| 2004/0212212 A1 | 10/2004 | Spencer et al. | |
| 2005/0205221 A1 | 9/2005 | Miller | |
| 2007/0056696 A1 | 3/2007 | Lin | |
| 2007/0175603 A1 | 8/2007 | Lin | |
| 2008/0006373 A1 | 1/2008 | Lin | |
| 2008/0211266 A1 | 9/2008 | Bergmiller et al. | |
| 2008/0289776 A1 | 11/2008 | Starzmann et al. | |
| 2010/0148540 A1 | 6/2010 | Hotta et al. | |
| 2011/0232851 A1 | 9/2011 | Uehara et al. | |
| 2012/0048489 A1 | 3/2012 | Oh et al. | |
| 2012/0255690 A1 | 10/2012 | Zeo et al. | |
| 2012/0274093 A1 | 11/2012 | Yue | |
| 2013/0204461 A1 | 8/2013 | Kartes | |
| 2013/0341954 A1 | 12/2013 | Maimin et al. | |
| 2013/0341955 A1 | 12/2013 | Garska | |
| 2013/0341956 A1 | 12/2013 | Garska | |
| 2013/0341957 A1 | 12/2013 | Garska | |
| 2013/0341958 A1 | 12/2013 | Mayfield et al. | |
| 2013/0341959 A1 | 12/2013 | Garska | |
| 2013/0341960 A1 | 12/2013 | Garska | |
| 2014/0252794 A1 | 9/2014 | Aho et al. | |
| 2016/0236549 A1 | 8/2016 | Stewart et al. | |
| 2016/0236552 A1 | 8/2016 | Hannan et al. | |
| 2016/0236554 A1 | 8/2016 | Stewart et al. | |
| 2016/0280123 A1 | 9/2016 | Rohr et al. | |

FOREIGN PATENT DOCUMENTS

| | | |
|---|---|---|
| EP | 2221429 A2 | 8/2010 |
| FR | 2527465 A1 | 12/1983 |
| FR | 2604203 A2 | 3/1988 |
| JP | 2011051528 | 3/2011 |
| WO | 2007082091 | 7/2007 |

OTHER PUBLICATIONS

Non-Final Office Action from U.S. Appl. No. 15/013,363, filed Feb. 2, 2016.

Non-Final Office Action from U.S. Appl. No. 15/013,369, filed Feb. 2, 2016.

Final Office Action from U.S. Appl. No. 15/013,369, filed Feb. 2, 2016.

Non-Final Office Action from U.S. Appl. No. 15/042,374, filed Feb. 12, 2016.

Non-Final Office Action from U.S. Appl. No. 15/042,358, filed Feb. 12, 2016.

Non-Final Office Action from U.S. Appl. No. 15/042,383, filed Feb. 12, 2016.

Notice of Allowance from U.S. Appl. No. 15/042,383, filed Feb. 12, 2016.

* cited by examiner

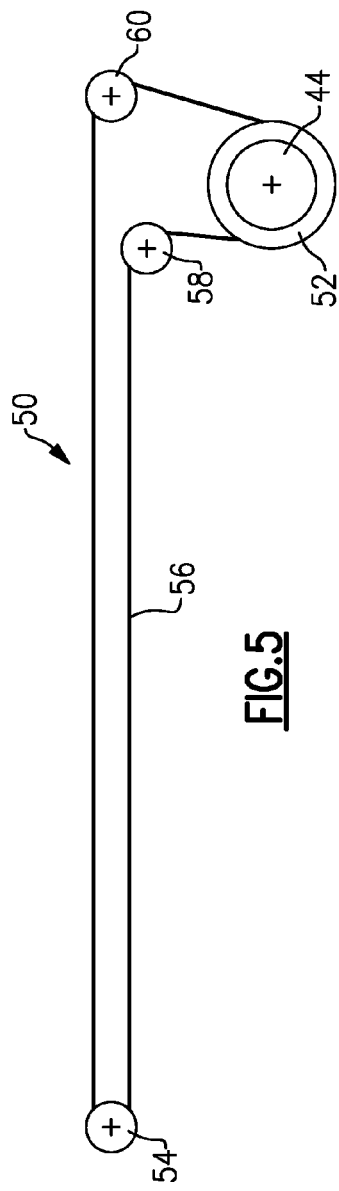
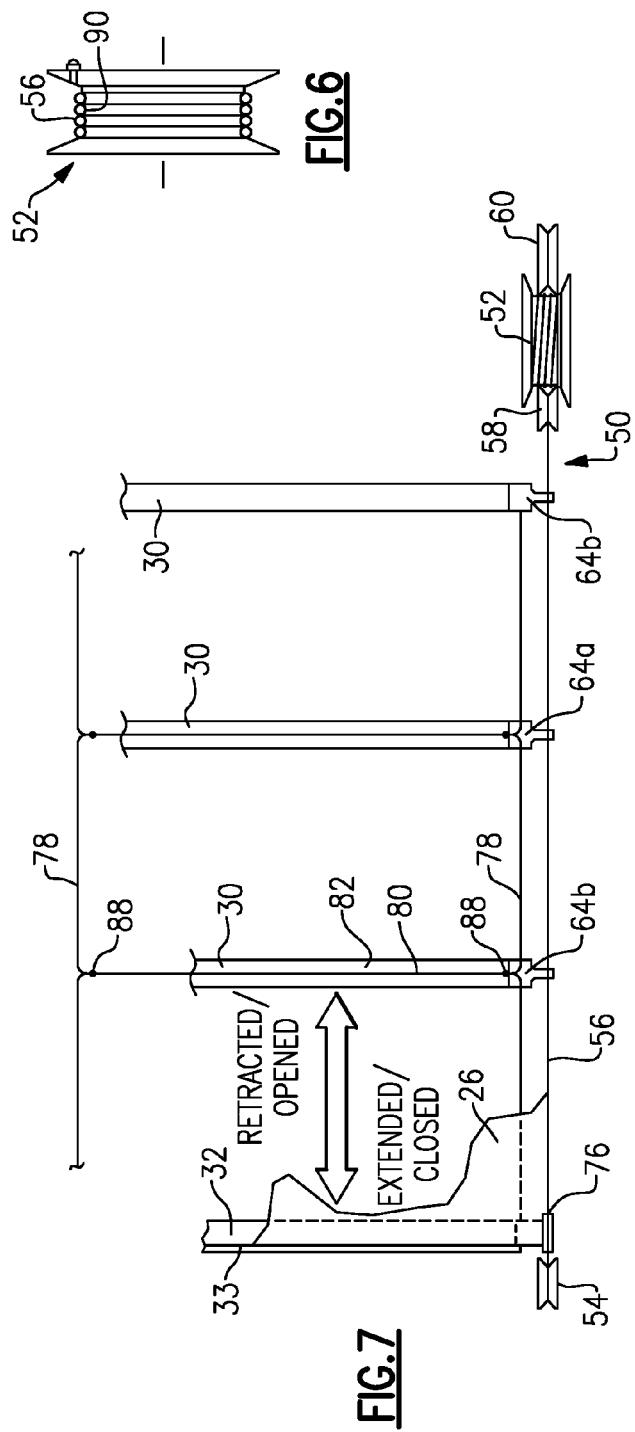

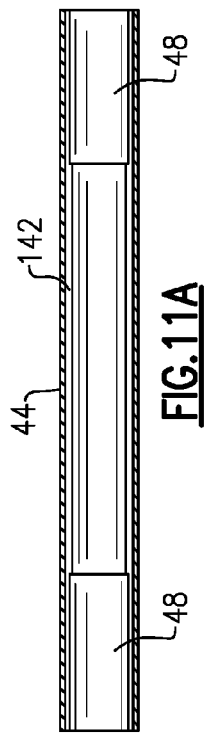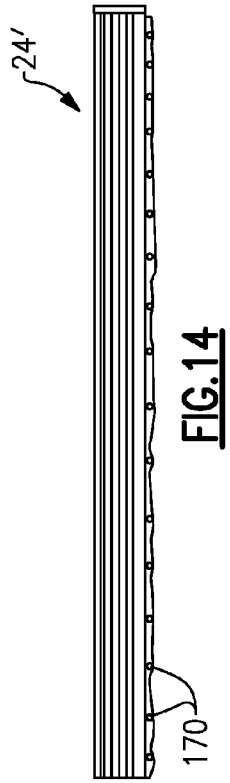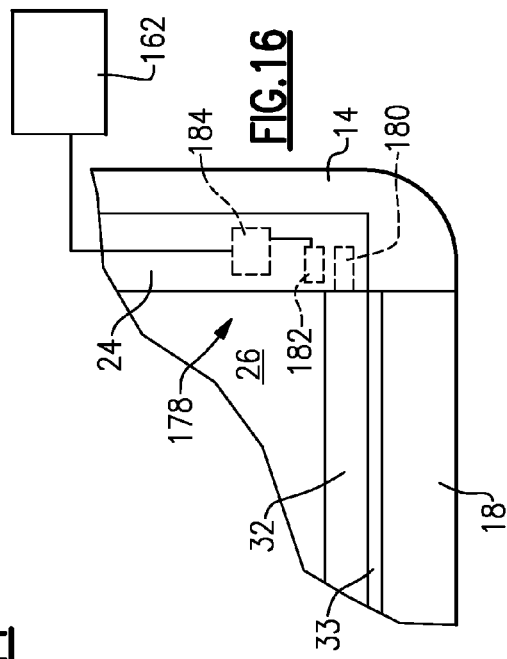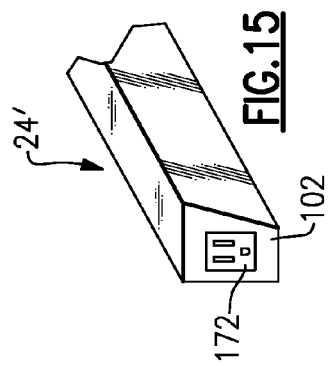

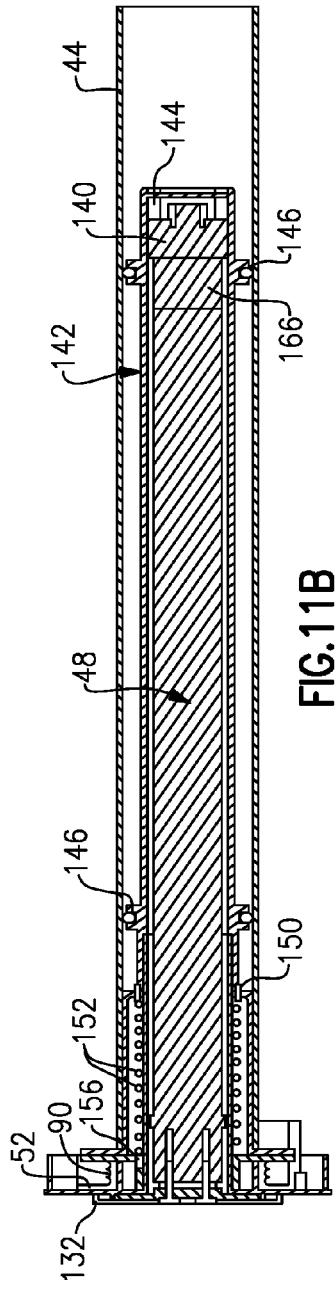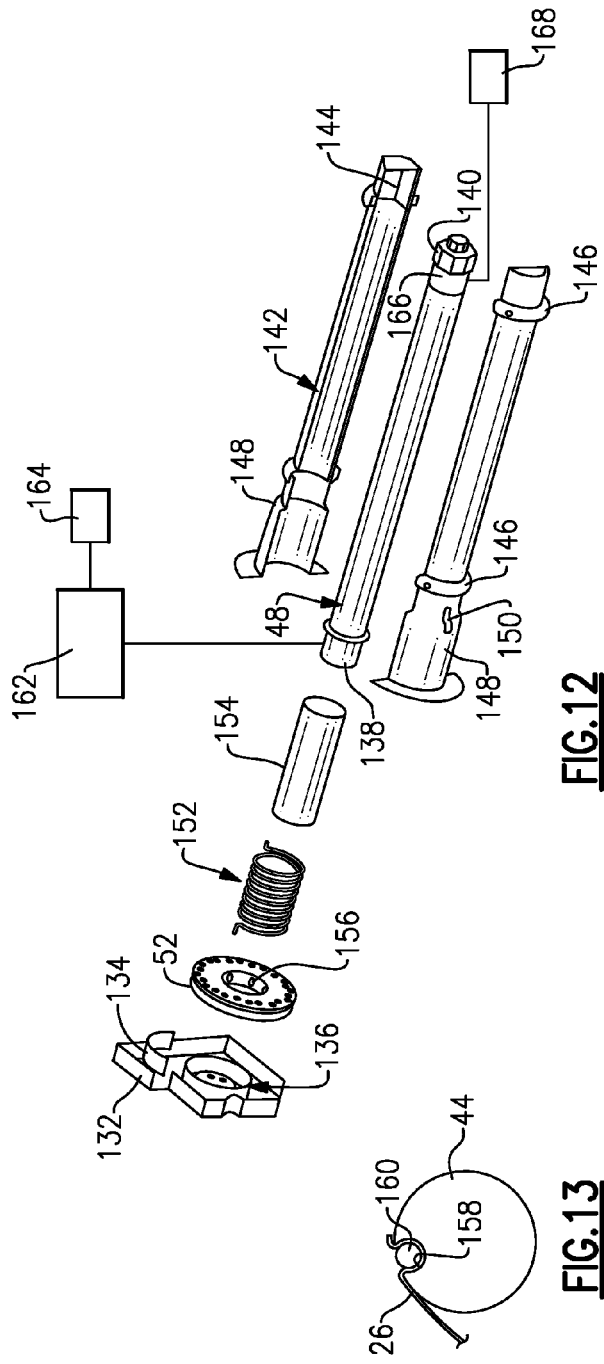

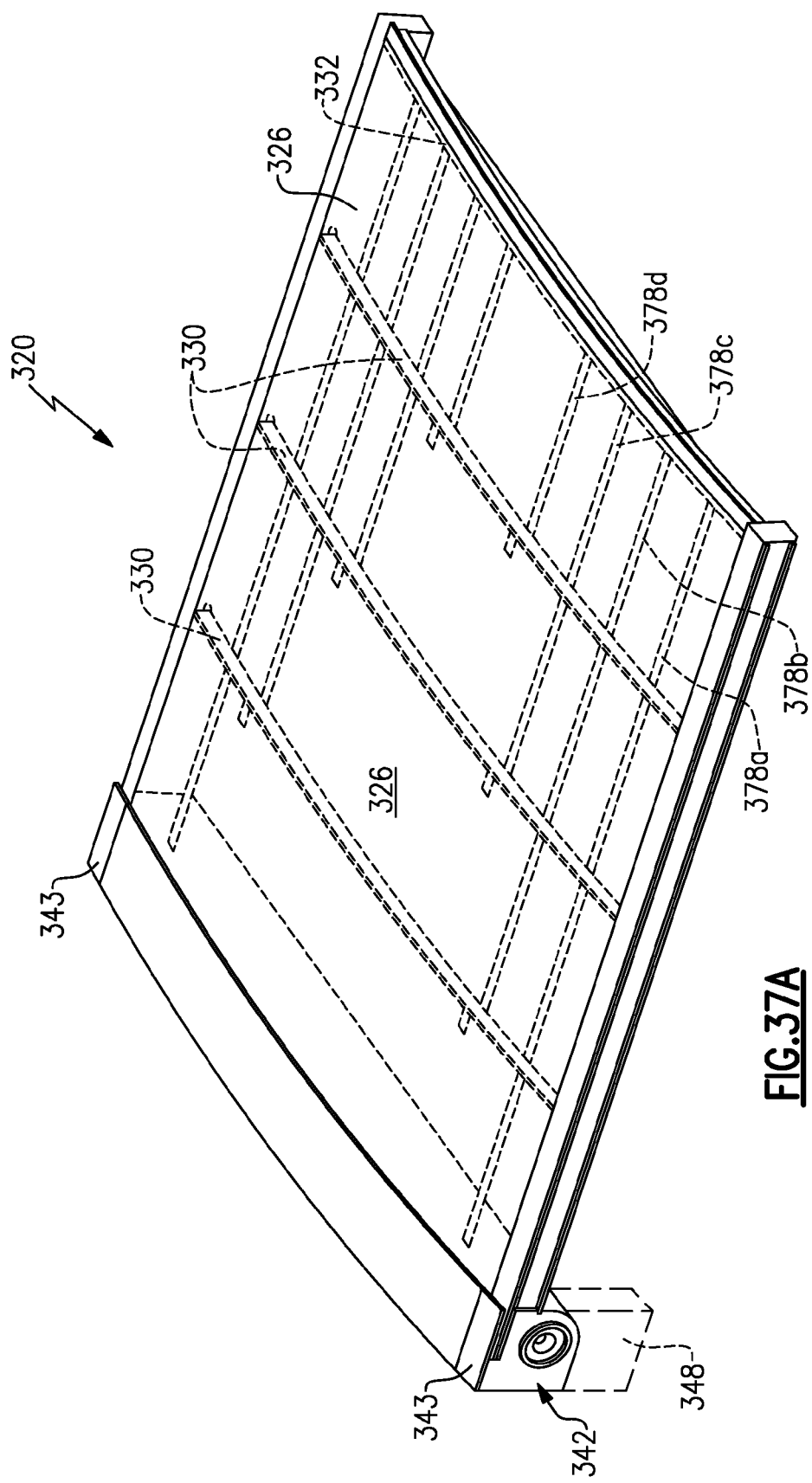

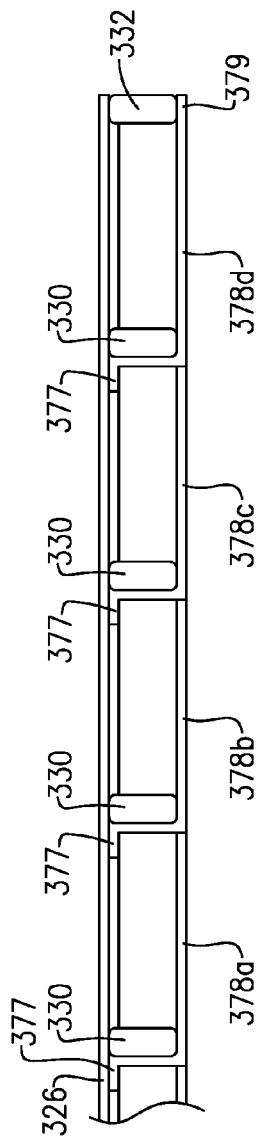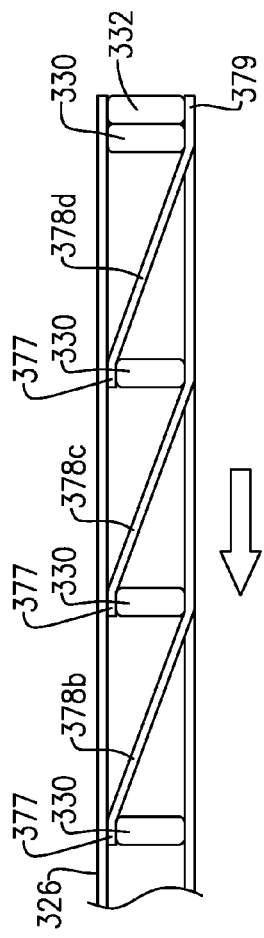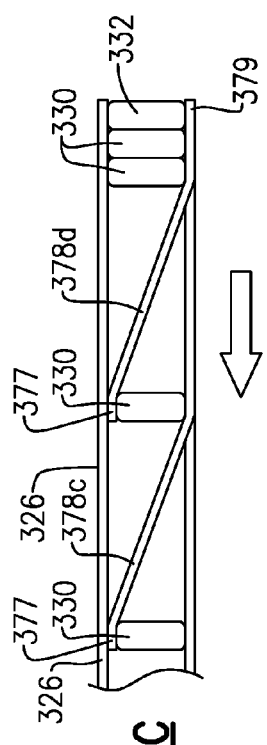

AUTOMATED SOFT TONNEAU COVER

CROSS-REFERENCE TO RELATED APPLICATIONS

This application claims priority to U.S. Provisional Application No. 62/220,412 filed Sep. 18, 2015, U.S. Provisional Application No. 62/220,416 filed Sep. 18, 2015, U.S. Provisional Application No. 62/220,420 filed Sep. 18, 2015, U.S. Provisional Application No. 62/115,710 filed Feb. 13, 2015, U.S. Provisional Application No. 62/115,720 filed Feb. 13, 2015 and U.S. Provisional Application No. 62/115,772 filed Feb. 13, 2015 and is incorporated herein by reference.

BACKGROUND

This disclosure relates to cover system used, for example, as a tonneau cover of a pickup truck bed. The cover system may also be used, for example, as a flexible roof or sunshade for vehicle applications, or for non-vehicle applications as well.

Tonneau covers are frequently used to enclose a pickup truck bed. Soft tonneau covers provide the advantage over hard covers of being able to be stowed in a relative small space when the cover is not in use. There has been an effort to provide a motorized tonneau cover, but these tonneau covers lack the advantages of soft tonneau covers, namely, their compactness when stowed. For example, typical motorized tonneau covers resemble a roll up garage door, which incorporate numerous rigid slats pivotally linked to one another. These arrangements are heavy and bulky, occupying a significant portion of the truck bed. What is needed is a motorized soft tonneau cover that is compact, weather resistant and sufficiently robust to withstand common load conditions.

SUMMARY

In one exemplary embodiment, a retractable cover system includes a frame that provides an opening and includes laterally spaced apart guide rails and includes a drive system. A flexible cover has laterally opposing edge portions with intermittent retainers received in the guide rails. The retainers are configured to slide relative to the guide rails between first and second positions within the opening in response to actuation of the drive system. Multiple spaced apart bows extend laterally between guide rails. The bows provide a laterally and outwardly extending arc that maintains tension on the flexible cover laterally between the retainers.

In a further embodiment of the above, each edge portion includes longitudinally spaced perforations with one of the retainers extending therethrough. Each retainer includes first and second retainer portions secured to one another and respectively arranged on first and second sides of the flexible cover.

In a further embodiment of the above, the retainers are arranged in a zipper-like configuration and are received in a track.

In a further embodiment of the above, a flap is secured to the cover and provides the edge portions. The flap wraps about an upper side of the guide rail. An end of the cover extends beyond the flap to an upper surface of the guide rail to enclose the retainers and the track.

In a further embodiment of any of the above, each guide rail includes a structural section and a covering section that is secured to the structural section. A first track is provided between the structural section and the covering section. The retainers are received in the first track.

In a further embodiment of any of the above, the structural section and the covering section respectively include first and second lips that provide a gap through which the flexible cover extends. The first and second retainer portions are configured to slide respectively on the first and second lips with the flexible cover under tension.

In a further embodiment of any of the above, the structural section includes first, second and third walls that extend from an upper side of the structural section. The first wall provides the first lip. The second and third walls include openings to fluidly connect the first track with an outer edge of the structural section.

In a further embodiment of any of the above, the third wall and an end of the covering section include removably interlocking features. A threaded fastener secures the covering section to the second wall.

In a further embodiment of any of the above, the multiple bows includes a last bow to which an end of the flexible cover is secured. The multiple bows include remaining bows that are unsecured to the flexible cover.

In a further embodiment of any of the above, a seal is mounted to the last bow and is configured to seal against a truck bed gate.

In a further embodiment of any of the above, the guide rails include a second track slidably supporting the bows.

In a further embodiment of any of the above, the drive system includes a cassette housing. A drain is provided in the cassette housing.

In a further embodiment of any of the above, the drive system includes a wiper that engages the flexible cover and is configured to remove debris.

In a further embodiment of any of the above, the cassette housing is configured to be arranged in a pocket provided by the truck bed. The drain is arranged at an exterior of the truck bed.

In a further embodiment of any of the above, the drive system includes a main roller about which the flexible cover is wrapped and unwrapped. One end of the flexible cover is secured to the main roller by an omega lock configuration.

In another exemplary embodiment, a method of operating a soft tonneau cover includes the steps of extending a cover to a closed position and securing an end of the cover in the closed position. The cover is retracted while in the closed position to make the cover taut.

In a further embodiment of any of the above, the securing step includes locking a last bow to a guide rail.

In a further embodiment of any of the above, the last bow is sealed against a tailgate.

In a further embodiment of any of the above, the retracting step includes wrapping the cover about a main roller.

BRIEF DESCRIPTION OF THE DRAWINGS

The disclosure can be further understood by reference to the following detailed description when considered in connection with the accompanying drawings wherein:

FIG. 5 is a schematic view of a cable system used to move the flexible cover and multiple bows between various positions.

FIG. 6 is an end view of a cable drum of the cable system shown in FIG. 5.

FIG. 7 is a schematic elevational view of the cable system and bows, which are tethered to one another.

FIG. 11A schematically illustrates a portion of a drive system with two motors.

FIG. 11B is a cross-sectional view through one end of an assembly including a main roller and a motor.

FIG. 12 is an exploded view of the assembly shown in FIG. 11.

FIG. 13 is a cross-sectional view of the flexible cover secured to the main roller.

FIG. 14 illustrates lighting integrated with the guide rail.

FIG. 15 depicts an electrical outlet integrated with the guide rail.

FIG. 16 schematically illustrates a latching mechanism for the cover system.

FIG. 37A is a perspective view of a tether arrangement with the cover in a fully extended/closed position.

FIG. 39A schematically illustrates the tether arrangement and bow positions with the cover in the fully extended/closed position.

FIG. 39B schematically illustrates the tether arrangement and bow positions with the cover in a partially retracted position.

FIG. 39C schematically illustrates the tether arrangement and bow positions with the cover in a more retracted position than shown in FIG. 39B.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates to a motorized, flexible cover system for use in a variety of applications. In one example, the cover system may be used as a tonneau cover to selectively provide access to a vehicle truck bed. The cover system may also be used as a flexible roof or sunshade for vehicle applications, or for non-vehicle applications as well.

Figure 1:
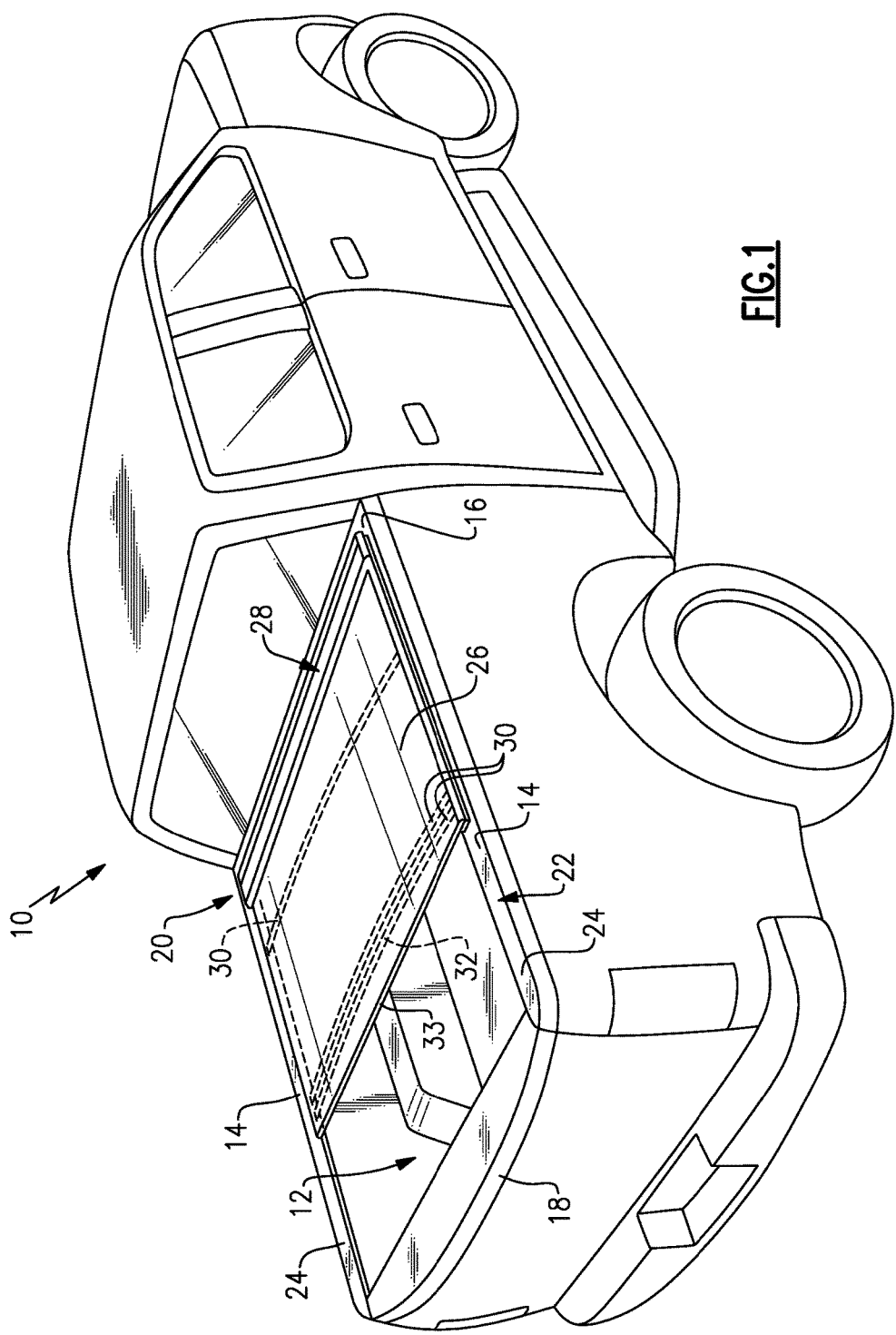
FIG. 1 schematically illustrates a pickup truck with an example cover system embodiment with a flexible cover in a partially open position with respect to a truck bed.

A vehicle 10 is schematically illustrated in FIG. 1. The vehicle 10 includes a truck bed 12 having lateral sides 14 and a front wall 16. A gate 18 is typically pivotally attached to a rear of the truck bed 12. A cover system 20 is mounted to the top of the truck bed 12 and is movable between open and closed positions, including in a partially open position, as illustrated. If desired, the cover system 20 can be moved between an infinite number of positions.

The cover system 20 includes a frame 22 having laterally spaced apart guide rails 24, which may be provided by aluminum extrusions. A flexible cover 26, or soft tonneau cover, which may be constructed from typical soft tonneau cover materials, for example vinyl, is supported by and can slide within the guide rails 24 secured to the lateral sides 14 of the truck bed 12. A drive system 28 slides the flexible cover 26 between the open and closed positions along a path provided by the guide rails 24.

Multiple bows 30, 32 are longitudinally spaced apart from one another and arranged beneath an underside of the flexible cover 26 to support, for example, aerodynamic loads and the weight of snow. The bow 32 is the last bow, which is farthest from the drive system 28 and nearest gate 18. A seal 33 is mounted to the bow 32 and engages the gate 18 when the flexible cover 26 is in the closed position. In one example, the bows 30 curve upward toward an underside of the flexible cover 26 in the lateral direction to provide improved support.

Figure 2:
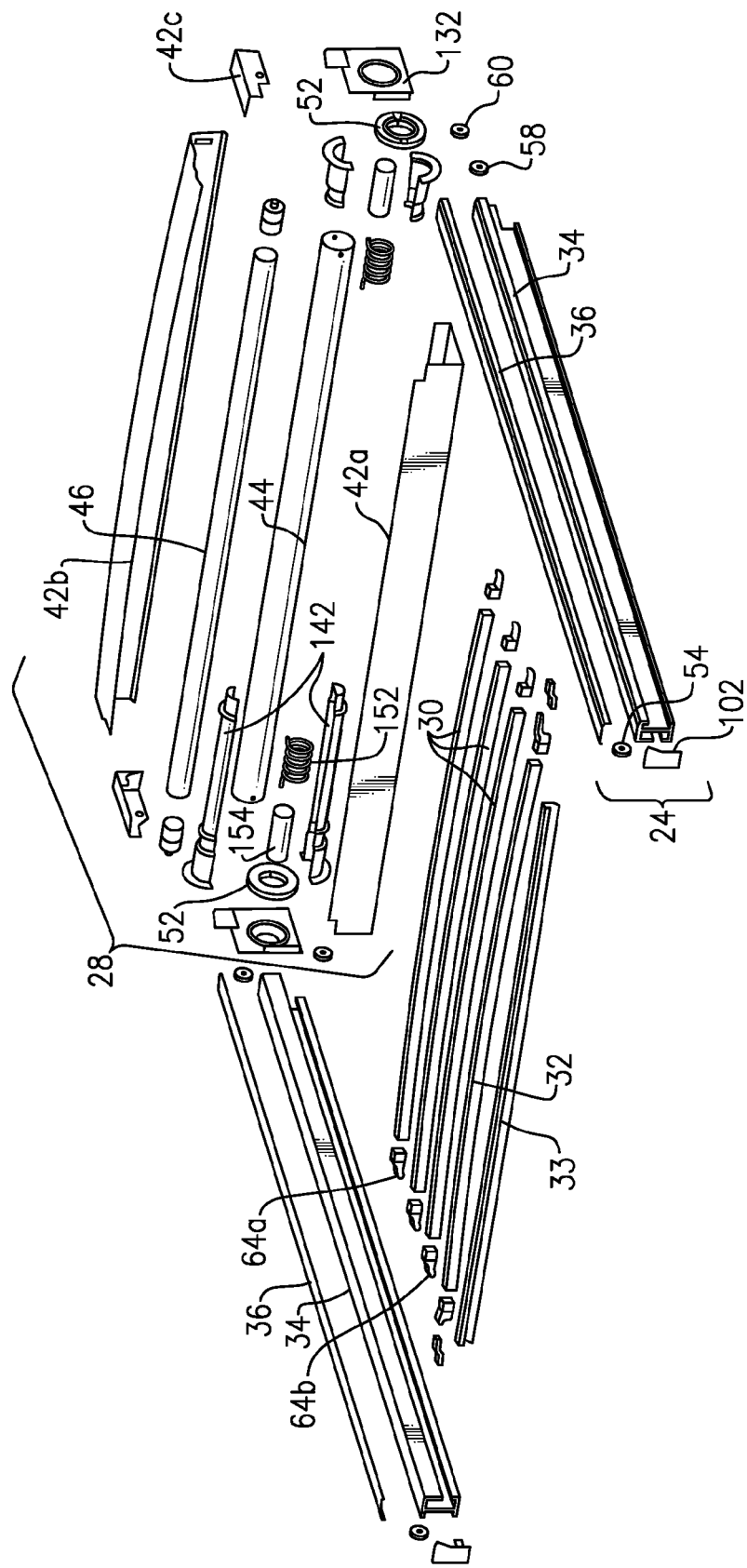
FIG. 2 is an exploded view of a portion of the cover system embodiment shown in FIG. 1.
Figure 3:
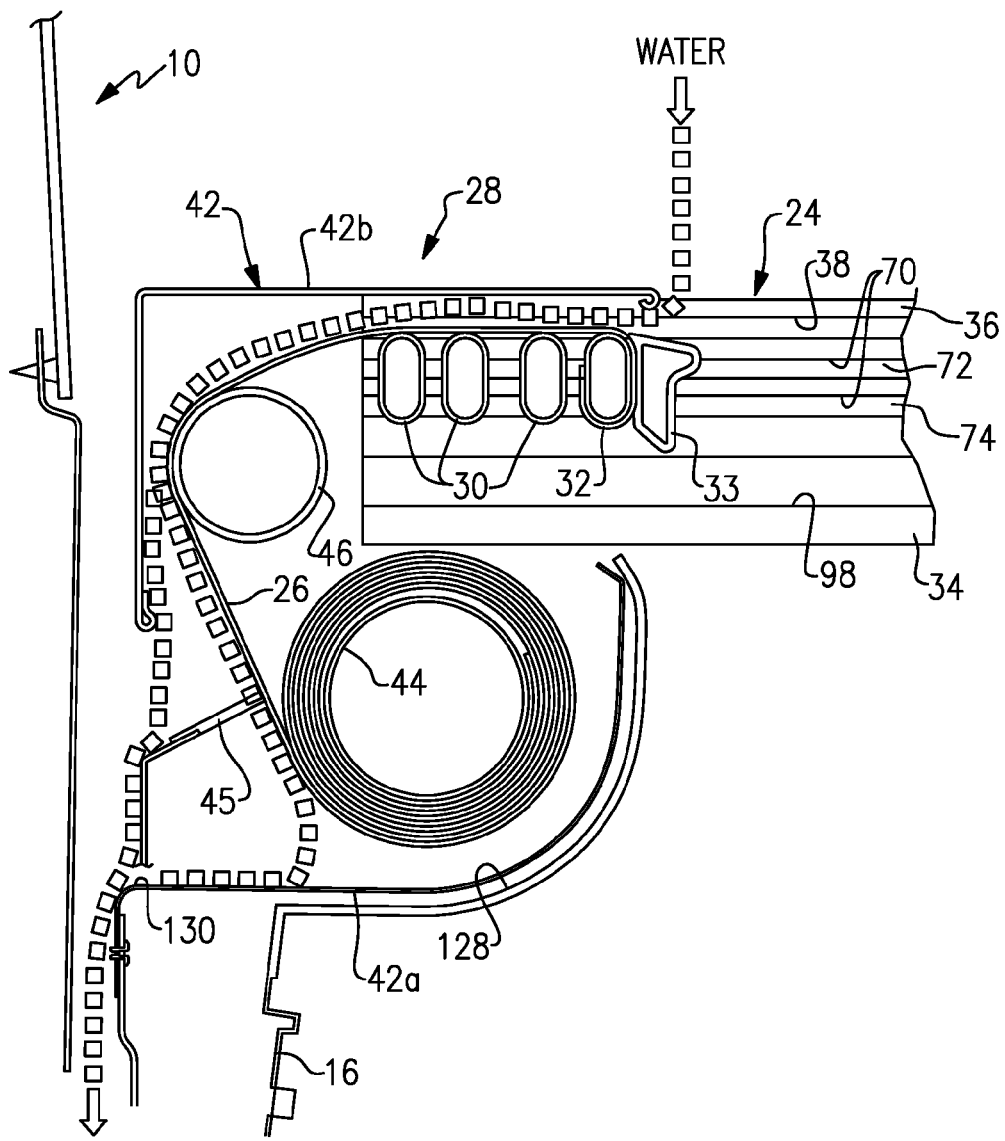
FIG. 3 is a cross-sectional view of a portion of the cover system in a stowed position in which the flexible cover is retracted, leaving the truck bed open.

Referring to FIGS. 2 and 3, the drive system 28 includes a cassette housing 42 that may be constructed from multiple components to facilitate assembly, for example, base and top portions 42a, 42b and trim piece 42c. As shown in FIG. 3, the cassette housing 42 is mounted to a preformed pocket 128 in the front wall 16 of the truck bed 12. A drain 130 is provided in the cassette housing 42, which drains water and debris to the exterior of the truck bed 12. A wiper or brush 45 clears debris from the upper surface of the flexible cover 26.

A main roller 44 is driven by one or more motors 48 to rotationally drive the main roller 44, about which the flexible cover 26 is wrapped and unwrapped when opened and closed. In one example, a pair of motors (one shown) is housed within the main roller 44 at opposing ends. The number of motors is selected based upon the application and requirements.

The bows 30, 32 are not wrapped about the main roller 44 with the flexible cover 26 when in the stowed position (FIG. 3). Instead, the bows 30 are able to slide both with respect to the guide rails 24 and the flexible cover 26 since the bows 30 are not affixed to either the guide rails 24 or the flexible cover 26. In the stowed position, the bows 30, 32 are retained within the guide rails 24 and stored bunched together within the cassette housing 42, as shown in FIG. 3. Thus, the flexible cover 26, drive system 28 and bows 30, 32 can be packaged in a very compact arrangement, occupying a minimal amount of space within the truck bed 12. Not wrapping the bows 30 about the main roller 44 also enables the use of laterally curved bows.

Figure 4:
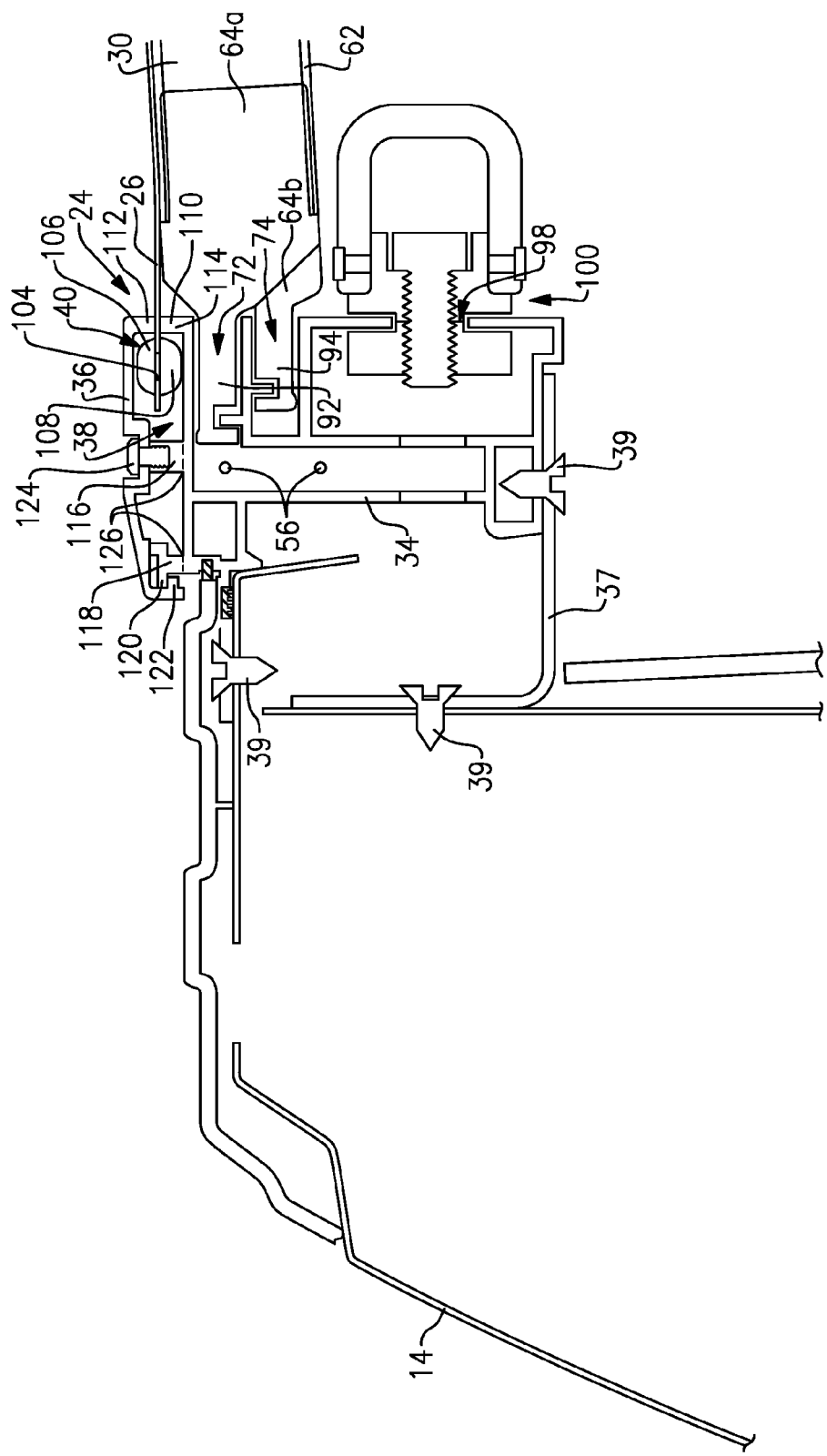
FIG. 4 is a cross-sectional view through a guide rail of the cover system shown in FIG. 2.

Referring to FIGS. 2-4, each guide rail 24 includes a structural section 34 and a cover section 36 secured to the structural section 34. Brackets 37 are secured to the side walls 14 by fasteners 39, as shown in FIG. 4. Holes in the brackets 37 receiving the fasteners 39 may be slotted to accommodate adjustment during assembly.

With continuing reference to FIG. 4, a first track 38 is provided between the structural and cover sections 34, 36. Edges of the flexible cover 26 include longitudinally spaced retainers 40 that are received within the first track 38. The spacing between the retainers 40 permit water and debris to flow off of the flexible cover and out through the guide rails 24 Interlocking features between the structural and cover sections 34, 36, such as tab 120 and hook 122, can be used along with fasteners 124 to secure the cover section 36 to the structural section 34 and retain the flexible cover edges within the first track 38.

The flexible cover 26 wraps about the main roller 44, as shown in FIG. 3, as the flexible cover 26 is moved from the close position to the open position. An idler roller 46 is arranged approximately level with the guide rails 24 to maintain the edges of the flexible cover 26 in alignment with the first track 38 as the flexible cover 26 is extended (closed) and retracted (opened).

Figure 10:
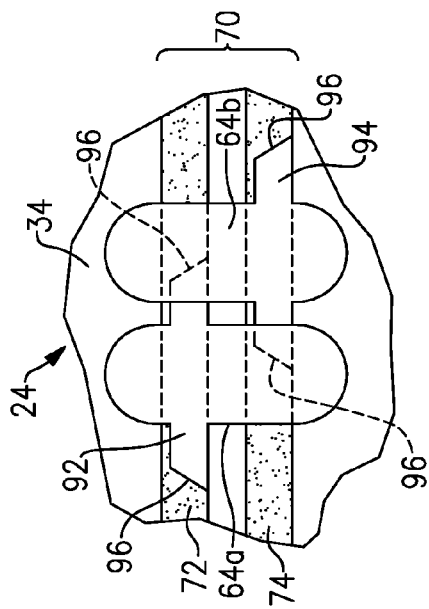
FIG. 10 is a schematic view of ends of adjacent bows in a stowed position within the guide rail and in which the flexible cover is retracted, leaving the truck bed open.

The bows 30, 32 are supported by and can slide within the second track 70, which includes upper and lower tracks 70, 72. One set of bows 30 is supported by ends 64a that ride along the upper track 72, and another set of bows 30 is supported by ends 64b that ride along the lower track. The ends 64a, 64b respectively include first and second bases 92, 94 that are wider than the width (68 in FIG. 8) of the bows to provide stability when sliding within the tracks, as shown in FIG. 10. Since upper and lower tracks 72, 74 are used, the wide first and second bases 92, 94 can be accommodated in overlapping relationship for compact packaging when the bows 30 are stowed with the flexible cover 26 fully retracted, exposing the truck bed 12. Forward and aft sides of the first and second bases 92, 94 include angle faces 96 that assist in clearing debris from the upper and lower tracks 72, 74.

The guide rails 24 include a third track 98 beneath the first and second tracks 38, 70. One or more cargo attachments 100 may be provided in the third tracks 98 to provide a feature to which straps, ropes or other cargo lashing devices may be attached. An end cap 102 may be provided in an end of the guide rails 24 to retain the components within and provide a finished appearance. Lighting 170 can be integrated with the guide rails 24' to illuminate the truck bed 12, as shown in FIG. 14. Electricity provided to the guide rails 24' supplying 12 volts DC and/or 110 or 220 volts AC, for example at an outlet 172 provided at the end cap 102.

A cable system 50, shown in FIGS. 5-7, cooperates with the main roller 44 to retract and extend the flexible cover 26. The cable system 50 also coordinates movement of the bows 30, 32 with the flexible cover 26 while permitting the bows 30 to slide independently of the flexible cover 26 using a tether 78 (FIG. 7), as will be explained in more detail below.

The cable system 50 includes a cable drum 52 arranged at either end of and coaxially with the main roller 44 (FIG. 2). A pulley 54 is arranged at an end of each guide rails 24 opposite the drive system 28. A cable 56, for example, a multi-strand steel cable, wraps about each cable drum 52 and pulley 54 set. In the example shown in FIG. 6, the cable drum 52 includes helical grooves 90, which prevents the cable 56 from wrapping about itself during operation which would cause undesired noise and wear. First and second idlers 58, 60 may be arranged to route the cables 56 from the cassette housing 42 to the guide rails 24, as shown in FIG. 5.

Referring to FIG. 7, ends of the last bow 32, which is secured to the end of the flexible cover 26, are clamped to a portion of each cable 56 (one shown) at connection 76 such that the last bow 32 moves in tandem with the cable 56. In operation, with the flexible cover 26 in a retracted position, the motor 48 is driven to unwrap the flexible cover 26 from the main roller 44 and open the soft tonneau cover. The motor 48 rotationally drives the cable drum 52 (along with the main roller 44) to pull the last bow 32 and the flexible cover 26 via the cable system 50 toward the gate 18 to draw the soft tonneau cover taut.

A tether 78 is provided on each side of the bows 30 to secure the bows to one another. One end of the tether 78 is secured to the last bow 32 nearest the gate 18, and the other end of the tether 78 is secured to the bow 30 nearest the drive system 28. The remaining bows 30 are secured to the tether 78 at evenly spaced intervals such that the bows 30 are evenly spaced within the truck bed opening when the soft tonneau cover is in the closed position and fully extended, as shown in FIG. 7. In operation, with the flexible cover 26 in the extended position, the motor 48 is driven to wrap the flexible cover 26 about the main roller 44 and open the soft tonneau cover. At the same time, the last bow 32 is pulled toward the cassette housing 42 by the cables 56. Since the bows 30 are not secured to the flexible cover 26, the last bow 32 will eventually catch up with the adjacent bow, and so on, and the bows will bunch together in the stowed position (FIG. 3) once the soft tonneau cover is fully retracted. When the flexible cover 26 is again extended, the last bow 32 will pull the other bows 30 to their desired spacing via the tether 78 (FIG. 7).

Figure 8:
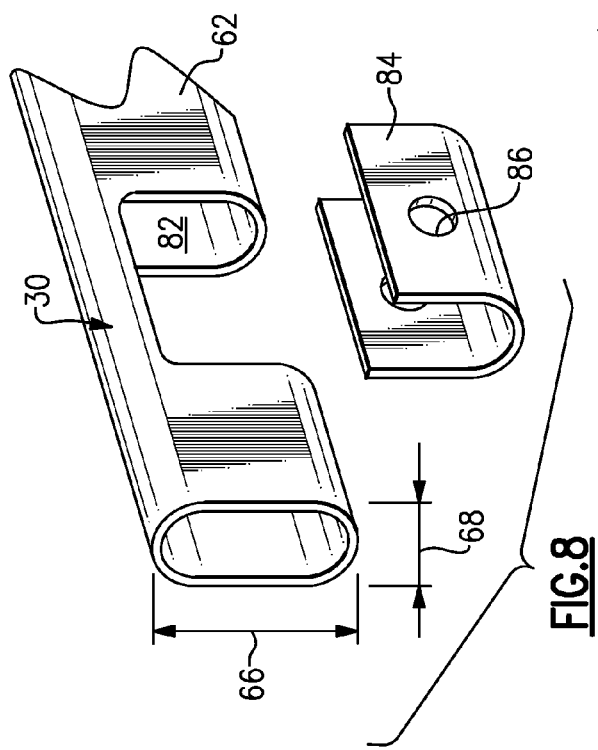
FIG. 8 is an exploded perspective view of a portion of a bow.

Referring to FIG. 8, the bows 30, which may be extruded aluminum, are provided by hollow bars 62 to which opposing ends 64 are connected. The bars 62 have a height 66 that is greater than the width, for example, by about two times. Such a dimensional ratio provides sufficient rigidity in the load direction (downward) while providing a narrow profile so the bows 30 can be tightly packaged when stowed (FIG. 2).

As described above, when the soft tonneau cover is not fully extended, the bows 32 will begin to bunch. As a result, the tether 78 will begin to go slack between the bows 30 and would otherwise hang into the cargo area of the truck bed. To prevent the tether 78 from hanging and possibly becoming entangled, a tensioning member 80 pulls the tether 78 out of the way. The tensioning member 80 may be constructed from a spring element or an elastomeric material.

Figure 9:
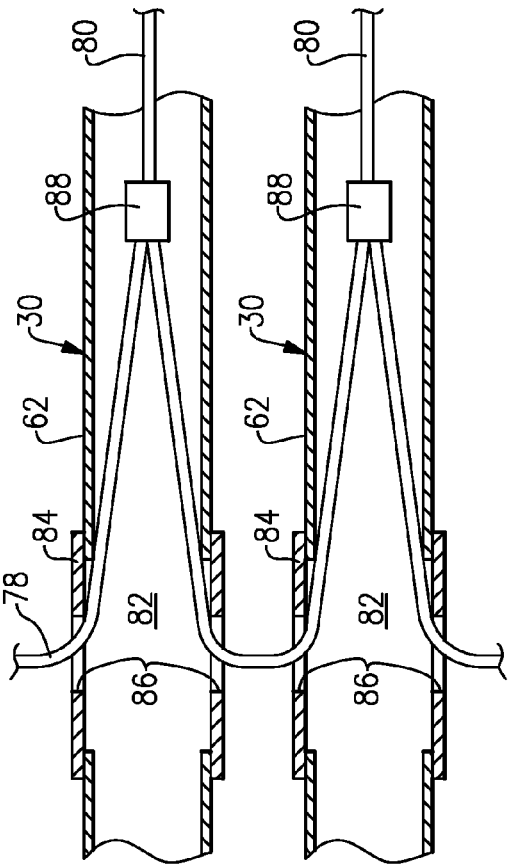
FIG. 9 is a cross-sectional view of portions of adjacent bows.

With continuing reference to FIG. 8, the bars 62 include notches in one example that expose a cavity 82. Access covers 84, which include holes 86, are arranged over the notches to enclose the cavities 82. Referring to FIG. 9, the tether 78 passes through the holes 86. A tensioning member 80 is arranged in each cavity 82 and is interconnected to the opposing tethers 78 (FIG. 7) by connectors 88. Any slack in tether 78 is pulled into the cavity 82 by the tensioning member 80 (FIG. 9) such that when the bows 30 are retracted and come closer to one another the tethers 78 will be prevented from hanging into the cargo box and becoming tangled in cargo.

Returning to FIG. 4, the edges of the flexible cover 26 include perforations 104. The retainers 40 extend through the perforations and include first and second portions 106, 108 arranged on opposing sides of the flexible cover 26. First and second lips 110, 112 are respectively provided by the structural and cover sections 34, 36. When the flexible cover 26 is laterally tensioned during use, the retainer 40 will ride against the first and second lips 110, 112. The structural section 34 includes first, second and third walls 114, 116, 118 that extend upwardly therefrom. The first wall 114 provides the first lip 110. The second and third walls 116, 118 include an opening 126 (shown by dashed lines) that fluidly connect the first track 38 with an outer edge of the structural section 34 to permit water to drain off of the flexible cover 26. The third wall 118 provides the tab 120.

Referring to FIGS. 11A, 11B and 12, the cassette housing 42 includes an end 132 at opposing lateral sides. Although only one motor 48 is shown in FIG. 11B, two motors 48 can be used as shown in FIG. 11A. Each end 132 includes an arcuate guide 134 that guides the edges of the flexible cover 26 between the main roller 44 and the first track 38. An inside face of the end 132 includes a bearing 136 that supports an inner diameter of the cable drum 52. The motor 48 includes a fixed end 138 secured to the end 132 by fasteners. A drive end 140 of the motor 48 is coupled to a motor housing 142, by a coupling 144. The motor housing 142 includes support rings 146 at an outer diameter that supports the main roller 44. The flexible cover 26 is secured to the main roller 44 by an "omega lock" configuration in which the flexible cover 26 is retained in a slot 158 by a cord 160, as shown in FIG. 13.

The motor housing 142 includes an enlarged neck 148 that receives a sleeve 154. A resilient member such as a torsion spring 152 is arranged radially between the sleeve 154 and the motor housing 142. One end of the torsion spring 152 is received in an aperture 150 of the motor housing 142, and another end of the torsion spring 152 is received in an aperture 156 of the cable drum 52.

The torsion spring 152 permits some relative rotation between the main roller 44 and the cable drum 52 as the flexible cover 26 is wrapped and unwrapped about the main roller 44. This is desirable since the cables 56 do not stretch during operation and the flexible cover 26 does. The outer diameter of the sleeve 154 and the inner diameter of the motor housing 142 provide the limits for relative angular movement between the main roller 44 and the cable drum 52 by acting as stops.

The motor 48 communicates with a controller 162 that receives commands from an input 164, such as a two-way switch, to open and close the soft tonneau cover. The controller 162 can provide a variety of functionality, for example, the controller may be configured to detect an obstruction to the flexible cover 26 within the truck bed 12. The controller 162 commands the motor 48 to open the flexible cover 26 in response to detecting the obstruction. In another example, the controller 162 may be programmed to open/close the flexible cover 26 to a predetermined position.

It may become necessary or desirable to operate the electric tonneau cover without use of the motor 48. Thus, the motor 48 may include a clutch 166 actuatable by an override device 168 to release the main roller 44 from the motor 48.

FIG. 16 schematically illustrates a latching mechanism 178 that is used to lock the flexible cover 26 when fully closed/extended. Each guide rail 34 (only one shown) includes a latch 182 that selectively cooperates with a stop 180 associated with the bow 32, for example. The soft tonneau cover will latch/lock when the flexible cover 26 is fully extended/closed. The motor 48 then rotates the main roller 44 slightly as if the cover 26 is being retracted. However, since the last bow 32 is maintained in its position near the tailgate, the cover 26 is pulled taut. In this manner, the cover 26 is tensioned and prepared for vehicle travel to better withstand aerodynamic loads. When a user wishes to open the cover 26, a command from the controller 162 is sent to an actuator 184 that first releases the latch 182, and then the flexible cover 26 can retract/open.

Another motorized, flexible cover system is illustrated in FIGS. 17-34. A vehicle 201 has a passenger cell with front and rear seats in a front region. Toward a rear of the pickup passenger motor vehicle, the passenger cell is adjoined by a pickup truck bed or load bed 202 which is delimited on all sides by upwardly protruding walls 203 to 205. The load bed 202 has a substantially horizontal floor. A front wall 205 which is extended in the vehicle transverse direction, is guided upward at a right angle with respect to the floor and is arranged immediately behind the passenger cell protrudes on the front side from the floor. Opposite longitudinal sides of the load bed 202 are formed by two side walls 204 which are extended in the vehicle longitudinal direction and likewise protrude upward from the floor. The side walls 204 open on the rear side into a rear wall 203 which is extended in the vehicle transverse direction and forms a rear-side termination of the load bed 202 which is open at the top. The rear wall 203 is provided in a manner which is not shown with a tailgate which can be folded rearward and downward, in order to make rear-side access to the load bed 202 possible.

Figure 17:
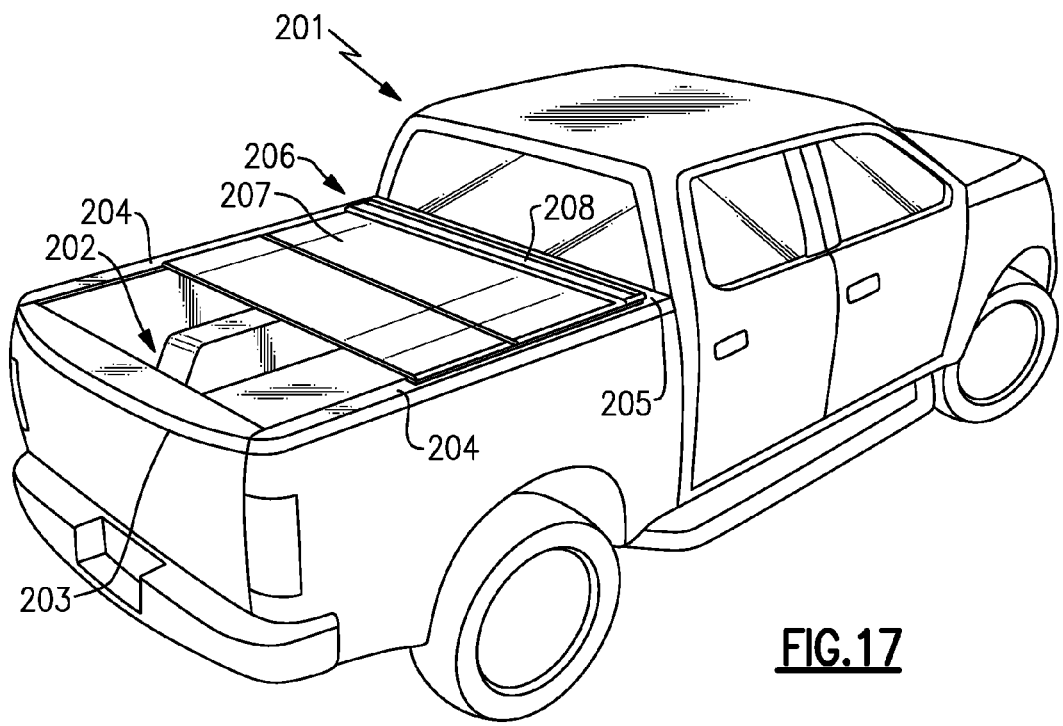
FIG. 17 diagrammatically shows a pickup passenger motor vehicle with one embodiment of a cover system.
Figure 18:
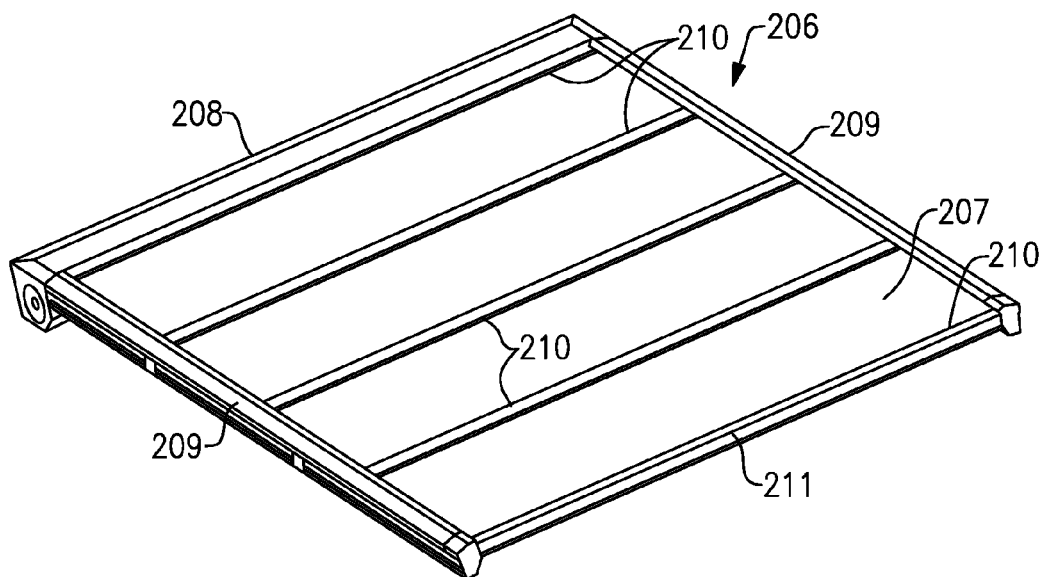
FIG. 18 shows the cover system according to FIG. 17 in a completely pulled-out covering position.
Figure 19:
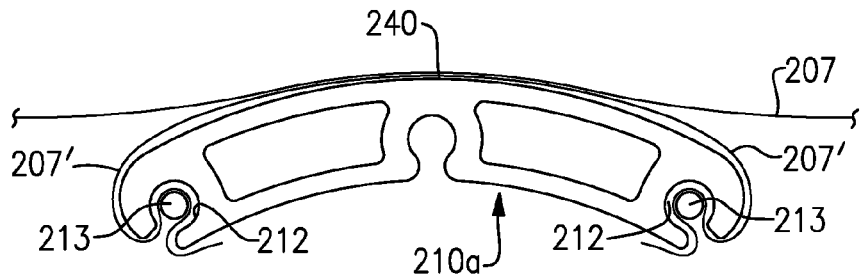
FIG. 19 shows a greatly enlarged, diagrammatic cross-sectional illustration of a part region of a flat structure of the cover system according to FIG. 18 in the region of a transverse bow.

In order for it to be possible to close the load bed 202 in an upper edge region of the walls 203 to 205, a cover system 206 is provided which will be described in greater detail in the following text using FIGS. 18 to 34. The cover system 206 has a tarpaulin-like, flexible flat structure, or flexible cover 207, which is held on a winding shaft 216 such that it can be wound up and unwound. The winding shaft 216 is mounted rotatably in a cassette housing 208 which serves as support structure, the cassette housing 208 being mounted in the region of the front wall 205 in the mounted state in the region of the load bed 202 of the vehicle 201. To this end, the front wall 205 has a cutout which is indicated in FIG. 17 and into which the cassette housing 208 is inserted in a flush manner. In the mounted operating state of the cover system 206, the winding shaft 216 and therefore also the cassette housing 208 extend in the vehicle transverse direction over a width of the load bed 202.

Two guide rail arrangements 209 which are connected to the front end regions of the cassette housing protrude parallel to one another from opposite front end regions of the cassette housing 208 in the pull-out direction of the flexible cover 207. In the mounted operating state of the cover system 206, the guide rail arrangements 209 protrude rearward in the vehicle longitudinal direction from the cassette housing 208 as far as toward the rear wall 203, the guide rail arrangements 209 flanking the flexible cover 207 on its longitudinal sides which lie opposite one another.

Figure 24:
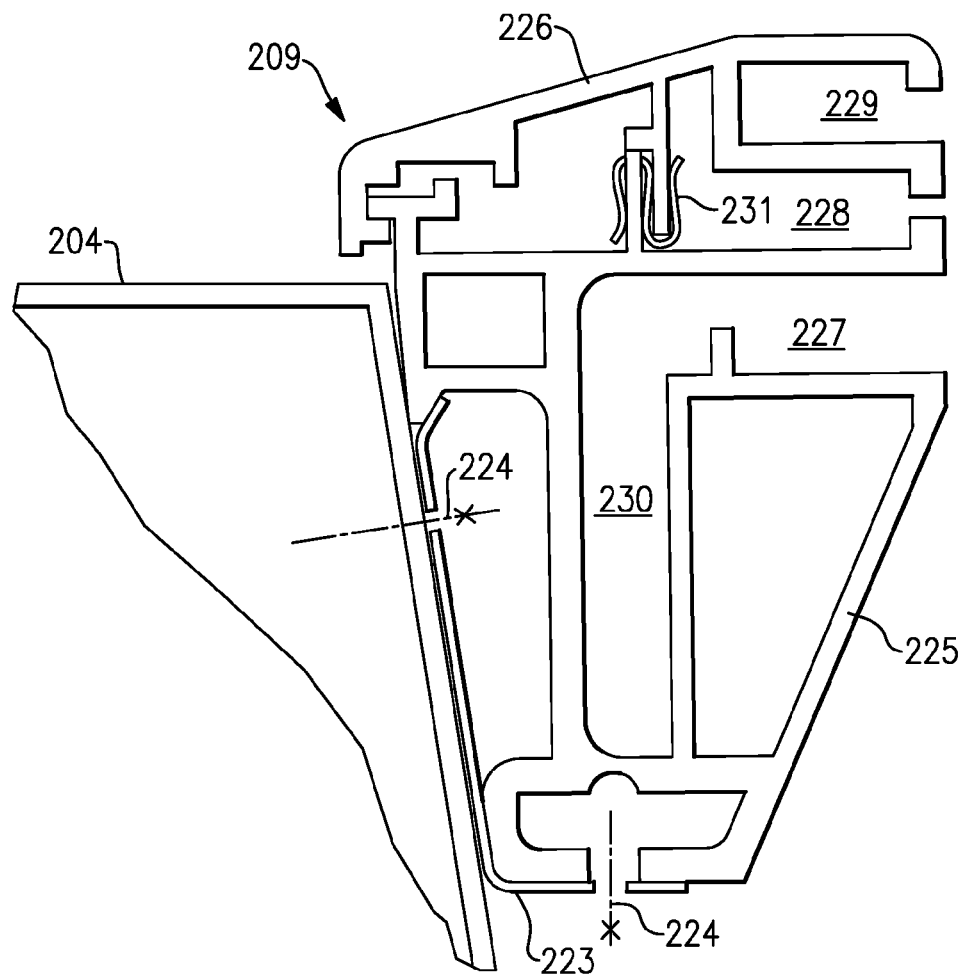
FIG. 24 diagrammatically shows a cross section through a guide rail arrangement of the cover system according to FIGS. 17 and 18 in the region of a side wall of the load bed of the pickup.

As can be seen using FIG. 24, each guide rail arrangement 209 is connected fixedly via at least one fastening fitting 223 and corresponding fastening screws 224 to the corresponding side wall 204 of the load bed 202. Here, first of all the respectively corresponding fastening fitting 223 is fastened to the side wall 204 by way of corresponding fastening screws 224, before subsequently the guide rail arrangement 209 is placed onto the at least one fastening fitting and is connected to the latter via floor-side fastening screws 224. The cassette housing 208 and the guide rail arrangements 209 form the stationary sections of the cover system 206, which stationary sections are connected fixedly via corresponding mechanical fasteners, such as, in particular, the fastening fittings 223, to the walls 204, 205 of the load bed 202 of the vehicle 201.

The flexible flexible cover 207 which is formed by a single-layer or multiple-layer textile or film web is reinforced over its length by way of a plurality of transverse bows 210, 210a which are positioned at uniform spacings from one another. The transverse bows 210, 210a have a convexly curved, arcuate cross-sectional profile, as can be seen clearly using FIGS. 19 to 23. The transverse bows 210, 210a are of dimensionally stable design and extend over an entire width of the flexible cover 207 in the vehicle transverse direction, in relation to the mounted operating state of the cover system 206. The transverse bows are oriented relative to the flexible cover 207 in such a way that the convex curvature of the transverse bows 210, 210a protrudes upward in the horizontally pulled-out covering position of the flexible cover 207 (FIG. 18), whereas the correspondingly concave curvature protrudes toward the load floor of the load bed 202. All the transverse bows 210 are connected in a positively locking manner via weather strip connections 212, 213 to the flexible cover 207. To this end, corresponding connecting sections 207' which extend in each case over a width of the flexible cover 207 have in each case one weather strip 213 which is pulled into in each case one weather strip groove 212 which is extended in the longitudinal direction of the transverse bows 210, 210a, and therefore in the vehicle transverse direction in the mounted state. The connecting sections 207' of the flexible cover 207 are connected fixedly to the flexible cover 207 in the region of seams 340, 340', in particular by way of welding, sewing or in another way.

As can be seen using FIGS. 19 to 23, two different variants are provided, in order to reinforce the flexible cover 207 by way of the transverse bows 210, 210a transversely with respect to the pull-out direction. In the embodiment according to FIGS. 19 and 22, the transverse bows 210a are arranged in the region of an underside of the flexible cover 207, that is to say on a side of the flexible cover 207 which faces the floor of the load bed 202. To this end, the connecting sections 207' are connected fixedly in the region of seams 340 to the flexible cover 207. The connecting sections 207' are guided on the outside around the convex curvature of the transverse bow 210a and are fixed in a positively locking manner in two lateral weather strip grooves 212 with the aid of corresponding weather strip cords 213.

Figure 20:
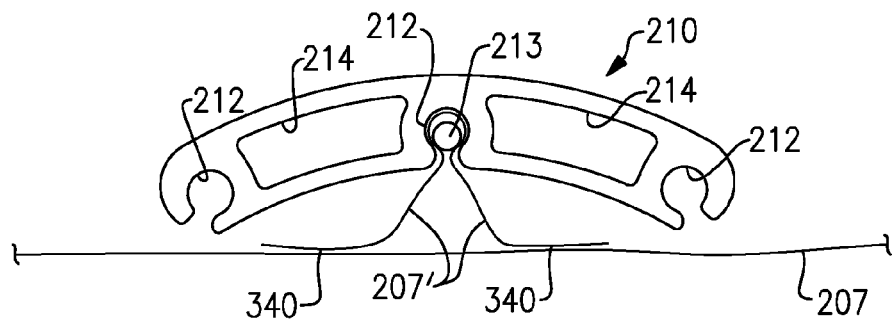
FIG. 20 shows a further embodiment of a flat structure for a cover system according to FIG. 18 in a cross-sectional illustration with a transverse bow which lies on the outside.
Figure 21:
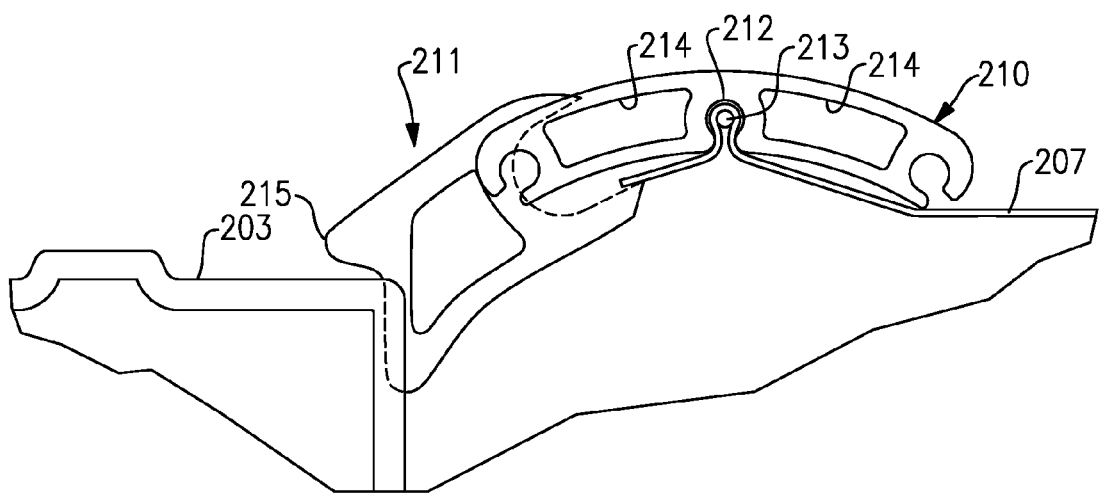
FIG. 21 diagrammatically shows a sectional illustration of a rear-side closure of the load bed, a pull-out profile of the flat structure being provided with an elastic hollow profile seal.
Figure 33:
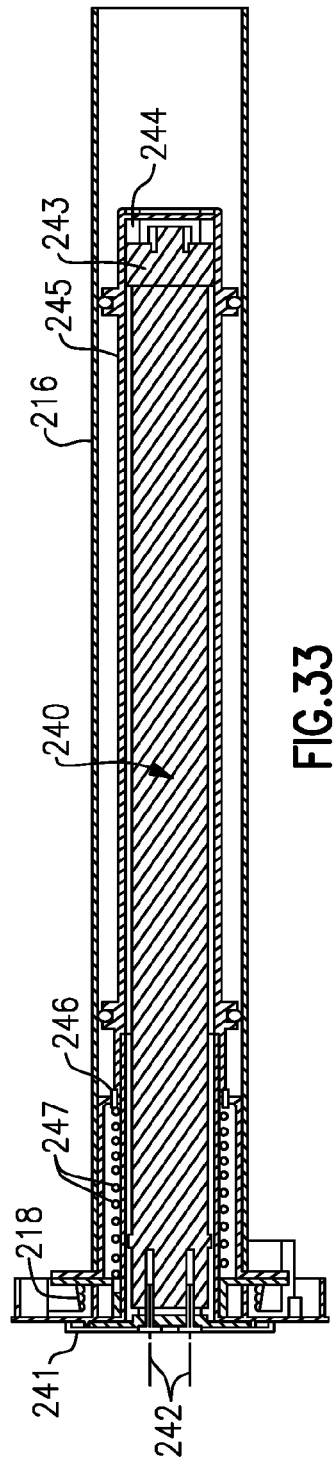
FIG. 33 diagrammatically shows a longitudinal sectional illustration through a winding shaft of the cover system according to FIGS. 17 to 32, which winding shaft is provided with an electric drive system.

In the embodiment according to FIGS. 20, 21 and 33, the connecting sections 207' are fastened via seams 340' in the region of an upper side of the flexible cover 207 and, including a common weather strip cord 213, protrude upward from the upper side of the flexible cover 207. In this variant, the corresponding transverse bow 210 is positioned visibly on the upper side of the flexible cover 207 and is connected in a positively locking manner via a middle, centrally arranged weather strip groove 212 to the connecting sections 207' and the weather strip cord 213 of the weather strip connection.

Each transverse bow 210, 210a is manufactured as a dimensionally stable hollow profile made from metal or from plastic, preferably in an extrusion process or an injection molding process.

All the transverse bows 210, 210a are designed identically to one another. A transverse bow 210 (FIGS. 18 and 21) which is arranged on the end side in the pull-out direction on a front end region of the flexible cover 207 is additionally provided on a longitudinal side which lies away from the flexible cover 207 with a hollow profile seal 211 which extends over an entire length of the transverse bow 210. The hollow profile seal 211 is formed in one piece from an elastomer body and can be deformed elastically. The hollow profile seal 211 has a water discharge lug 215 which, in the pulled-out covering position of the flexible cover 207 (FIGS. 18 and 21), protrudes rearward beyond an upper edge of the rear wall 203. In the covering position, in which the load bed 202 is closed completely, the hollow profile seal 211 bears sealingly against the rear wall 203 in an elastically deformed manner in the region of a corresponding boundary edge of said rear wall 203, the water discharge lug 215 which is extended over the entire length of the hollow profile seal 211 being positioned above the upper edge of the rear wall 203 according to FIG. 21 and partially protruding obliquely rearward beyond the upper side of the upper edge of the rear wall 203. Accordingly, the hollow profile seal 211 forms a water-tight termination of the flexible cover 207 with the rear wall 203 in the closed covering position of the flexible cover 207.

Each transverse bow 210, 210a is provided on its opposite end sides with in each case one sliding body 233 which can be plugged in a non-positive manner via plug-in profiles 234 in the form of plug-in journals into complementary, end-side plug-in profiles of the transverse bow 210, 210a in the form of plug-in sockets 214. The sliding body 233 forms an end-side termination of the end side of the respective transverse bow 210, 210a. All the transverse bows 210, 210a are provided in each case with corresponding sliding bodies 233 on their end sides which lie opposite one another, as can be seen using FIG. 27. On an outer side which faces away from the transverse bow 210, 210a, each sliding body 233 has a horizontally extended guide blade (not denoted in greater detail) which is mounted in a guide groove 229 (which will be described in greater detail in the following text) of the respective guide rail arrangement 209 such that it can be moved slidingly along the guide rail arrangement 209. The guide blade is provided on the edge side with an upwardly protruding retaining cam 235 which ensures positively locking retention of the respective sliding body 233 in the vehicle transverse direction within the guide groove 229 of the guide rail arrangement 209.

Apart from one exception, the sliding bodies 233 of all the transverse bows 210, 210a are designed identically to one another. This is because the end-side transverse bow 210 which forms an end-side termination of the flexible cover 207 is provided with a modified sliding body 233a. The sliding body 233a (FIG. 26) is provided with an additional driver lug M which protrudes downward in a hook-like manner and interacts in a positively locking manner with a corresponding web G of a drive body 232 in a manner which will be described in greater detail in the following text. On its end sides which lie opposite one another, the end-side transverse bow 210 has in each case one sliding body 233a of this type which is provided with a corresponding driver lug M.

In each case one drive body 232 is mounted longitudinally displaceably in each of the two guide rail arrangements 209, which drive body 232 is provided in each case with a corresponding web G which enters into a plug-in connection with the corresponding driver lug M in the pull-out direction of the flexible cover 207. To this end, the hook-shaped driver lug M of each sliding body 233a is open to the rear toward the cassette housing 208, with the result that the corresponding web G can dip into the open side of the driver lug M, in order for it to be possible to drive the driver lug M and therefore the sliding body 233a in the pull-out direction in a positively locking manner. The plug-in connection which is produced as a result between the corresponding web G and the driver lug M has a force flow of such a magnitude that the plug-in connection between the sliding body 233a and the drive body 232 is not released even in the case of a movement in the opposite direction of the drive body 232 in the winding-up direction of the flexible cover 207.

The two drive bodies 232 are mounted in each case in a drive channel 227 of the respective guide rail arrangement 209 such that they can be moved slidingly along the respective guide rail arrangement 209. As can be gathered from FIG. 24, the drive channel 227 is open toward the center of the load bed 202, that is to say toward the flexible cover 207, which otherwise also applies to the guide groove 229. The drive channel 227 is adjoined laterally to the outside in the guide rail arrangement 209 by a receiving region 230 which serves to receive a drive transmission element which is configured as a cable pull 219, 236, 218, 220 (FIGS. 22 and 26) in the embodiment according to FIGS. 17 to 34. Both guide rail arrangements 209 are identical, but are designed so as to be mirror-symmetrical with respect to one another. In each case one cable pull is integrated into both receiving regions 230 of the guide rail arrangements 209 which lie opposite one another. Each cable pull is formed by a wire cable 219 which is deflected over a rear-side deflection roller 236 (FIG. 26) and a cassette housing-side deflection roller 220 and is held on a cable drum 218 which is coaxial with respect to the winding shaft 216. In this way, one end of the wire cable 219 is held on the cassette housing-side cable drum 218, whereas an opposite cable end of the wire cable 219 is connected fixedly to the respective drive body 232.

The respective deflection roller 236 is mounted in a stationary manner in the respective guide rail arrangement 209 such that it can be rotated. The receiving region 230, the drive channel 227 and the guide groove 229 extend continuously with a constant cross section over the entire length of the guide rail arrangement 209.

Figure 25:
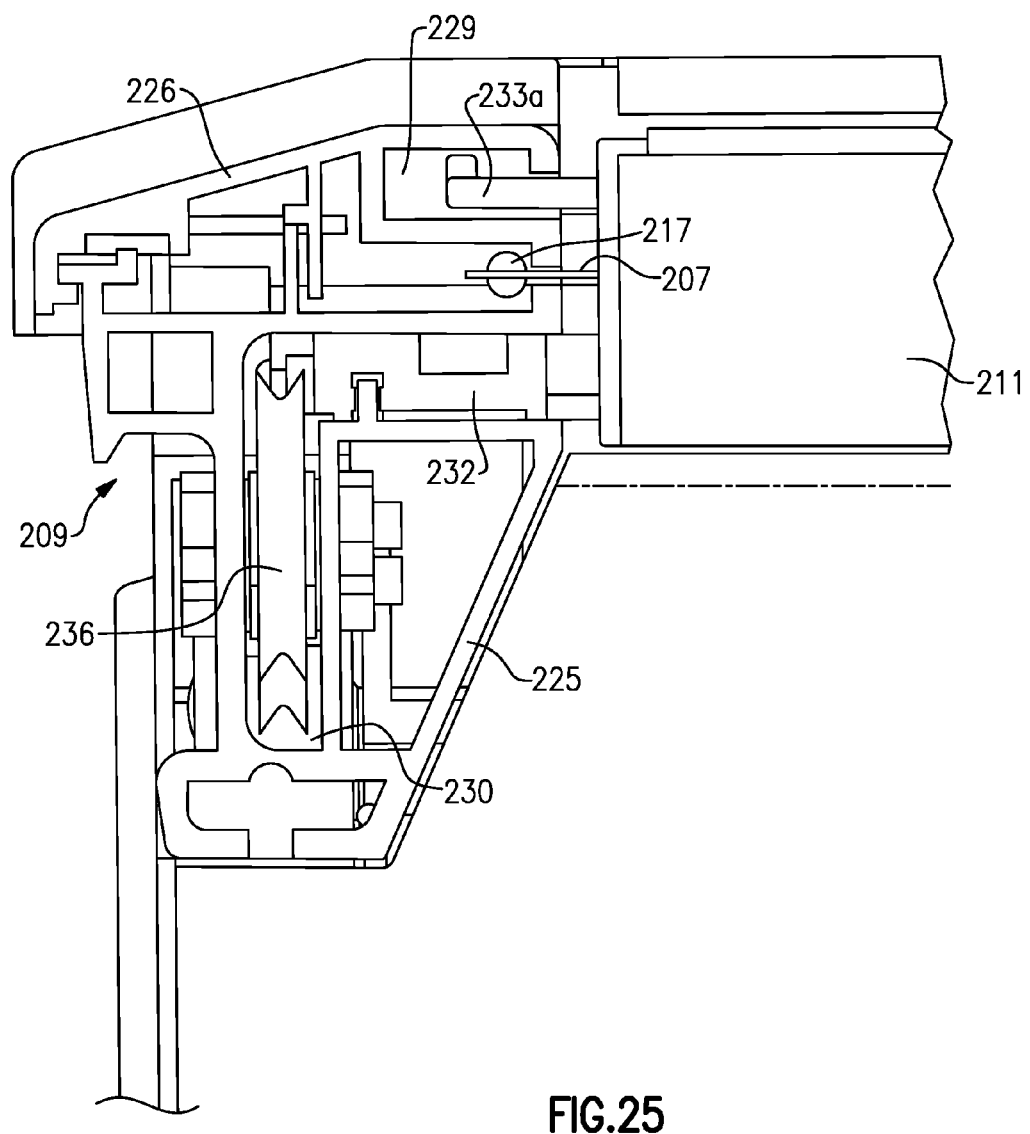
FIG. 25 shows a detail of the cover system according to FIGS. 17 to 24 in the region of the guide rail arrangement according to FIG. 24.
Figure 26:
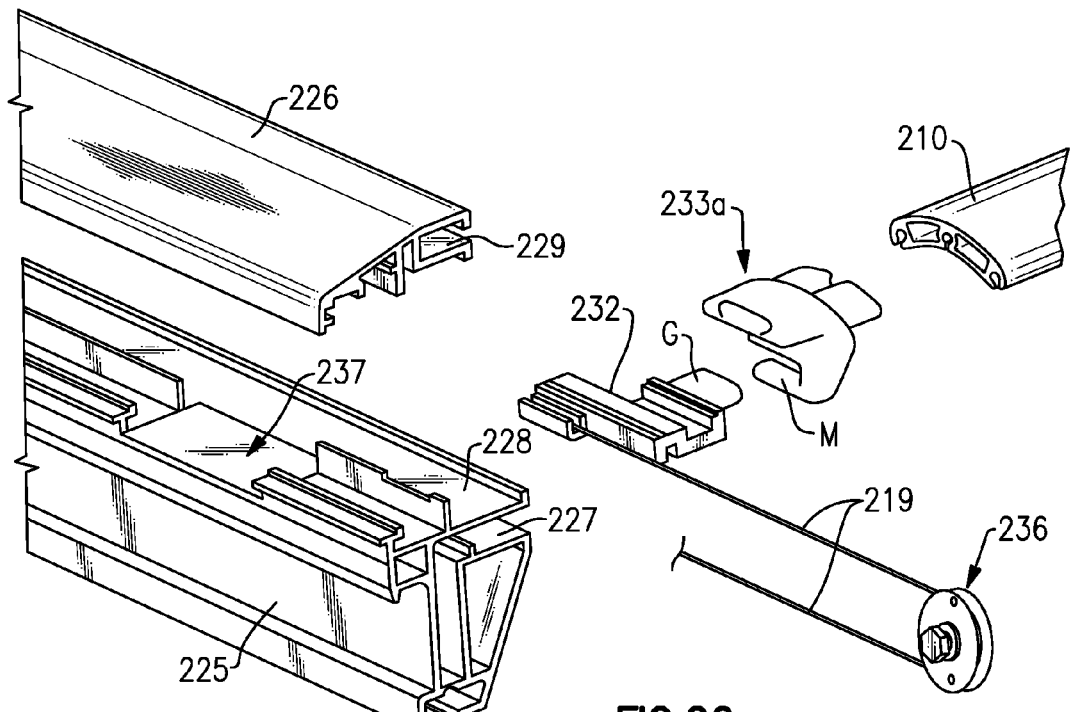
FIG. 26 shows an exploded illustration of a part region of the cover system according to FIGS. 17 to 25.
Figure 27:
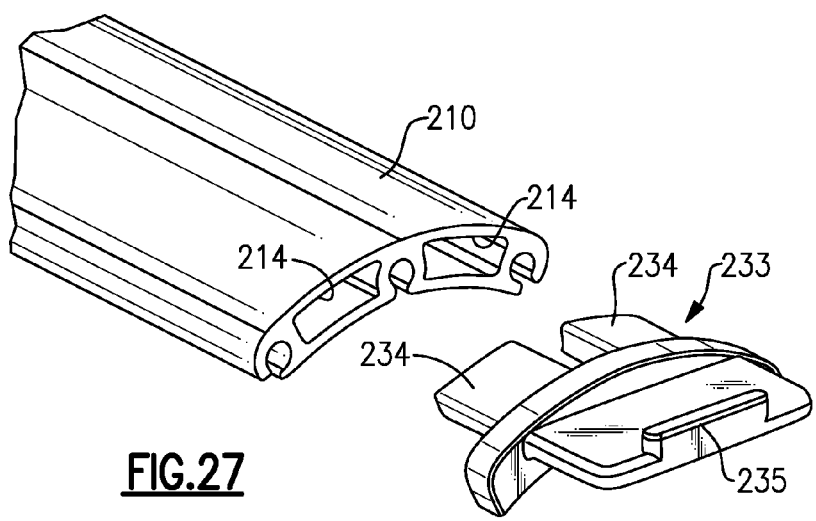
FIG. 27 shows an enlarged exploded illustration of an end side of a transverse bow of a flat structure of the cover system according to FIG. 26.
Figure 28:
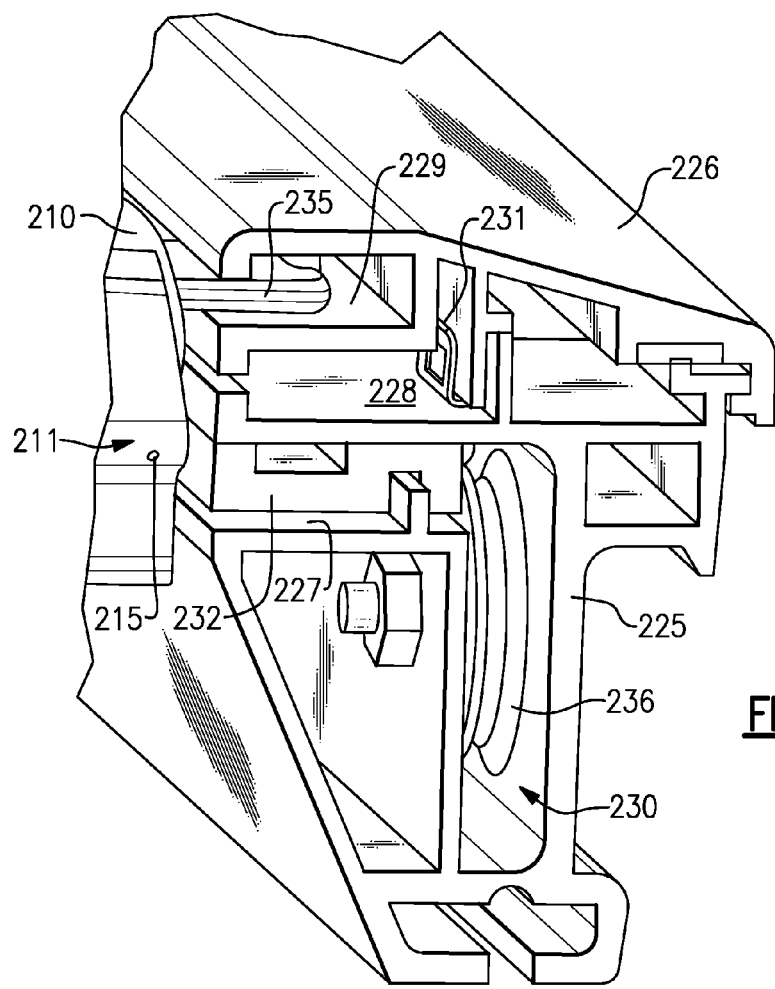
FIG. 28 shows a perspective sectional illustration of a detail of the cover system in the region of a guide rail arrangement which lies opposite the guide rail arrangement according to FIG. 25.
Figure 29:
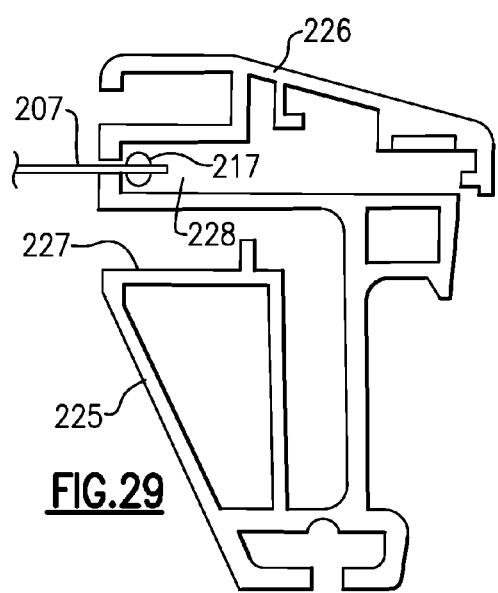
FIG. 29 diagrammatically shows the guide rail arrangement according to FIG. 28 in a cross-sectional illustration with an illustration of a lateral guide function for the flat structure.
Figure 30:
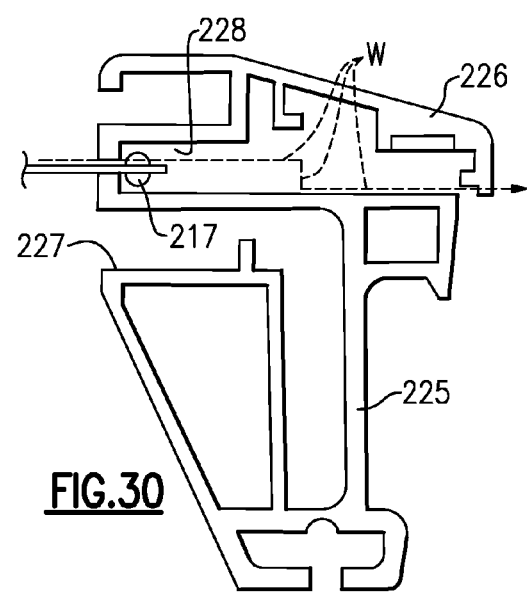
FIG. 30 shows the illustration according to FIG. 29 with an additional pictorial illustration of a water discharge function.

As can be gathered from FIGS. 25, 29 and 30, the flexible cover 207 is additionally provided on its longitudinal sides which lie opposite one another with a multiplicity of lateral guide elements 217 which are designed as bead parts and are connected fixedly to the longitudinal edges of the flexible cover 207. Here, the lateral guide elements 217 of in each case one longitudinal side of the flexible cover 207 are positioned in a row behind one another in the pull-out direction. The lateral guide elements 217 protrude through the thickness of the flexible cover 207 and protrude both to the upper side and to the underside of the respective longitudinal edge of the flexible cover 207. The thickness (as viewed in the vehicle vertical direction) of the lateral guide elements 217 is accordingly substantially greater than a thickness of the flexible cover 207. The lateral guide elements 217 are guided in a positively locking manner in the vehicle transverse direction in the region of each longitudinal side of the flexible cover 207 in in each case one lateral guide channel 228 of the respective guide rail arrangement 209. Here, the longitudinal edges of the flexible cover 207 protrude in each case transversely with respect to the pull-out direction through a corresponding longitudinal slot into the respective lateral guide channel 228 of the guide rail arrangement 209. Accordingly, the flexible cover 207 is guided over its entire length with its lateral longitudinal edges which lie opposite one another in the guide rail arrangements 209 which lie opposite one another.

Each guide rail arrangement 209 is formed by a two-piece hollow profile made from lightweight metal alloy, preferably an aluminum extruded profile, or from a suitable plastic material. The hollow profile comprises a lower structure section 225 and an upper covering section 226 which are detached from one another or can be connected to one another along an approximately horizontal dividing plane. Both the structure section 225 and the covering section 226 are configured in each case as single-piece hollow profile bodies. The structure section 225 comprises the drive channel 227 and the receiving region 230 and a lower half of the lateral guiding channel 228. The covering section 226 comprises the guide channel 229 for the sliding bodies 233, 233a of the transverse bows 210, 210a. The covering section 226 is connected to one another via hook-in webs which are complementary with respect to one another and are not denoted in greater detail in the region of that outer side of the guide rail arrangement 209 which faces the side walls 4 and via central, vertically upward or downward protruding supporting webs which are likewise not denoted in greater detail. In the region of the vertical supporting webs, the joining together of the covering section 226 and the structure section 225 is assisted via a plurality of spring clamping elements 231 which serve as a connection in the form of relief spring clamps which are bent in an S-shape. Here, the supporting webs which are assigned to the structure section 225 have cutouts 239, into which the spring clamping elements 231 can be inserted. The supporting webs of the covering section 226 are plugged in a simple manner from the top into the mounted spring clamping elements 231. Accordingly, the respective covering section 226 can be connected to the associated structure section 225 without tools and can be dismantled again without tools in the same way. In the region of said dividing plane between the respective covering section 226 and the structure section 225, water discharge paths are provided distributed over the entire length of the hollow profile bodies, which water discharge paths, according to the diagrammatic illustration according to FIG. 30, can discharge water W, which strikes the flexible cover 207 from above, laterally to the outside through the hollow profile bodies via the respective side wall 204 to the vehicle outer side. The water discharge paths are produced by way of water guide bevels 237 in the region of an upper side of the structure section 225 and by way of complementary water discharge openings 238 in the supporting web of the associated covering section 226. The water discharge bevels 237 are combined with cutouts (not denoted in greater detail) of the upwardly protruding supporting web of the structure section 225. The water discharge bevels 237 are lowered slightly obliquely downward from the middle of the upper side of the structure section 225 toward the outer side.

Figure 31:
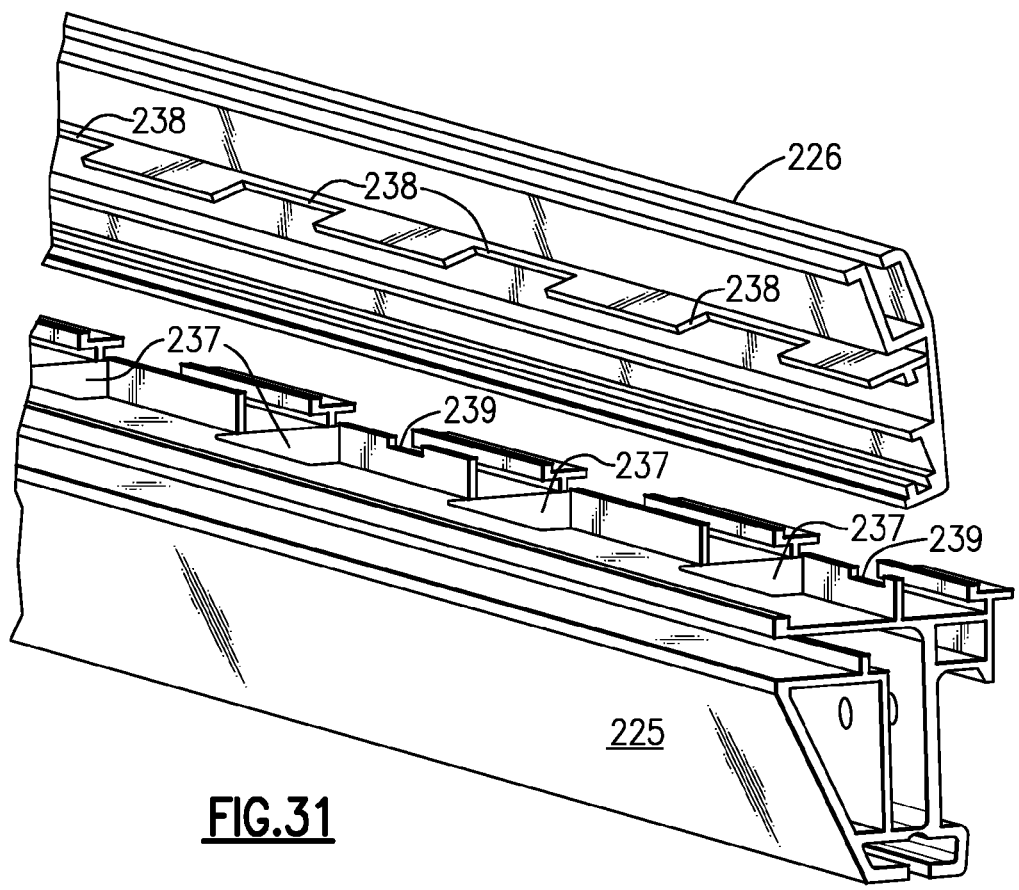
FIG. 31 shows an exploded illustration of the guide rail arrangement according to FIGS. 28 to 30 with a covering section and a structure section.
Figure 32:
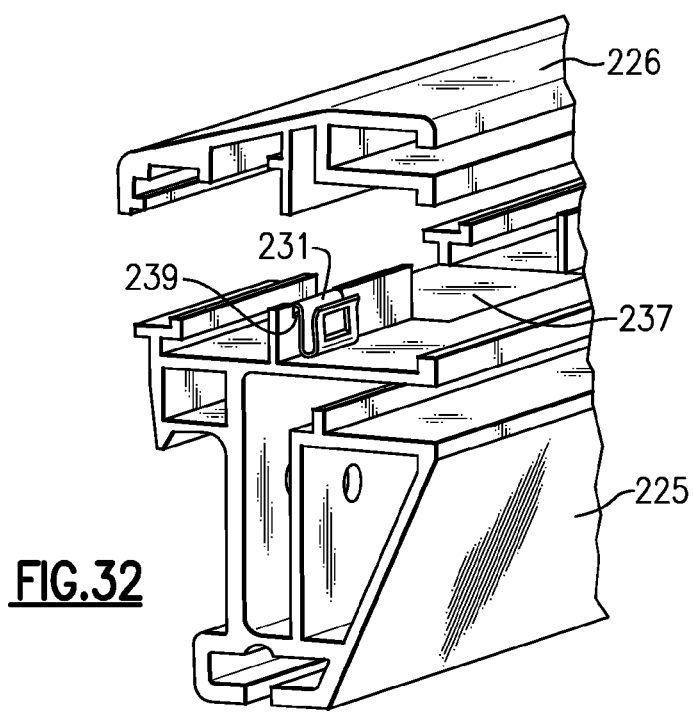
FIG. 32 shows the opposite guide rail arrangement according to FIGS. 24 and 25 in an exploded illustration, in which a spring clamping element for fixing the covering section on the structure section can be seen.

As can be seen using FIGS. 31 and 32, an outer-side side edge of the structure section 225 is also interrupted by corresponding openings in the region of the water discharge bevels 237, with the result that unimpeded discharging of water through said openings laterally to the outside is made possible.

Figure 22:
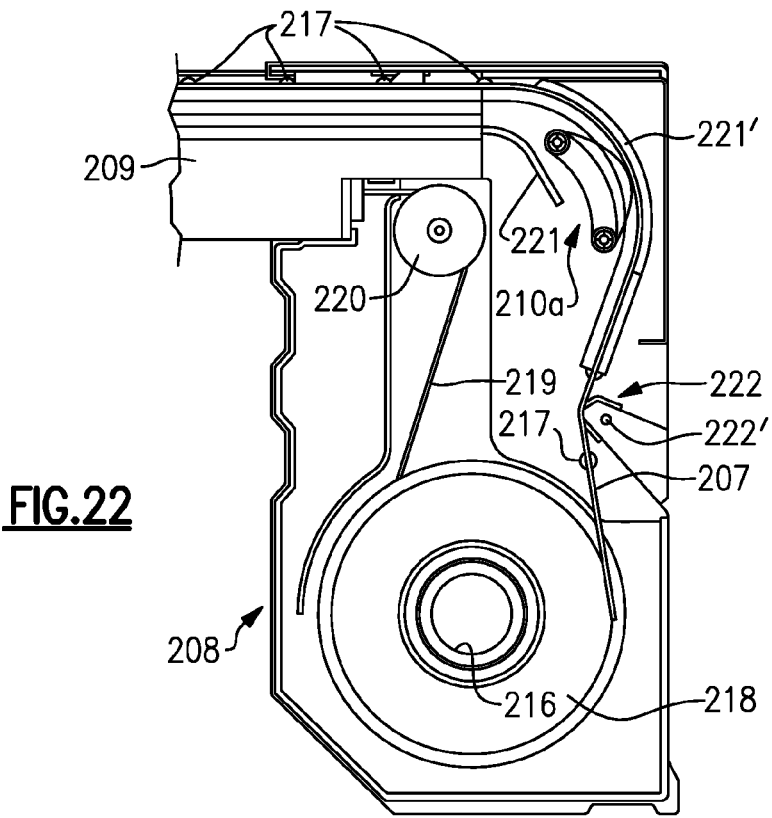
FIG. 22 diagrammatically shows a sectional illustration of a winding-up region of a winding shaft of the cover system according to FIGS. 17 to 21.
Figure 23:
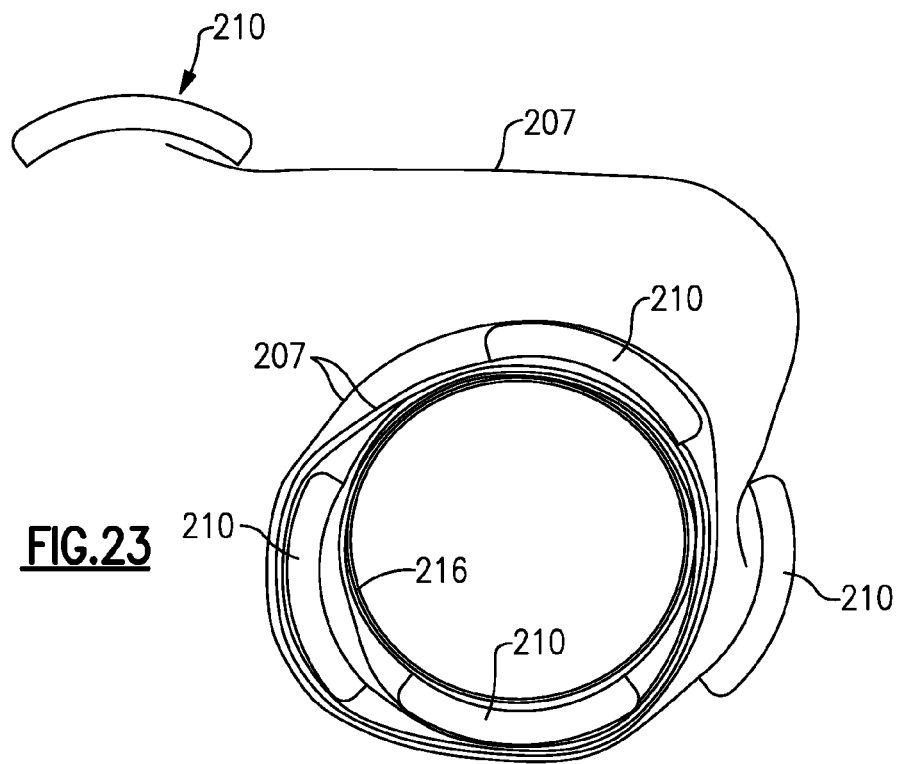
FIG. 23 diagrammatically shows the winding up of a flat structure, provided with transverse bows, of the cover system according to FIGS. 17 to 22 in a partially wound-up state.

As can be seen using FIGS. 22 and 23, the flexible cover 207 is wound onto the winding shaft 216 and is unwound from the latter. Here, in the winding-up region in the region of the cassette housing 208, the transverse bows 210, 210a are oriented with respect to the winding shaft 16 in such a way that the convex curvature of the transverse bows 210, 210a protrudes radially to the outside relative to a rotational axis of the winding shaft 216. Compact winding up of the flexible cover 207 together with the transverse bows 210 is ensured as a result. In addition, the transverse bows 210, 210a are spaced apart from one another, as viewed in the pull-out direction of the flexible cover 207, in such a way that, during winding up of the flexible cover 207, the transverse bows 210 (FIG. 23) in the different winding layers are positioned in each case in a staggered manner with respect to one another. Thus, in each case one transverse bow 210 of the respectively outer winding layer is positioned between two transverse bows 210 which are spaced apart from one another of a winding layer which lies radially further to the inside. This likewise ensures compact winding of the flexible cover 207 onto the winding shaft 216.

In order to ensure that the transverse bows 210, 210a are wound onto the winding shaft 216 in a correct, space-saving orientation, deflection element 221, 221', 222' are provided which, according to FIG. 22, cause S-bend guidance of the flexible cover 207 after exiting from the guide rail arrangement 209 and before being wound onto the winding shaft 216. The deflection element 221, 221', 222' are positioned in a stationary manner in the cassette housing 8. In addition, the deflection element 222' comprises a cleaning strip 222 which cleans an upper side of the flexible cover 207. To this end, the cleaning strip 222 has brushes or other mechanical cleaning elements in the region of its surface which interact mechanically with that surface of the flexible cover 207 which slides past in the region of the deflection element 222' and achieve a mechanical cleaning function as a result.

Each wire cable 219 is held such that it can be wound up and unwound in each case on a cable drum 218 which is positioned coaxially with respect to the winding shaft 216 on opposite ends of the winding shaft 216.

Figure 34:
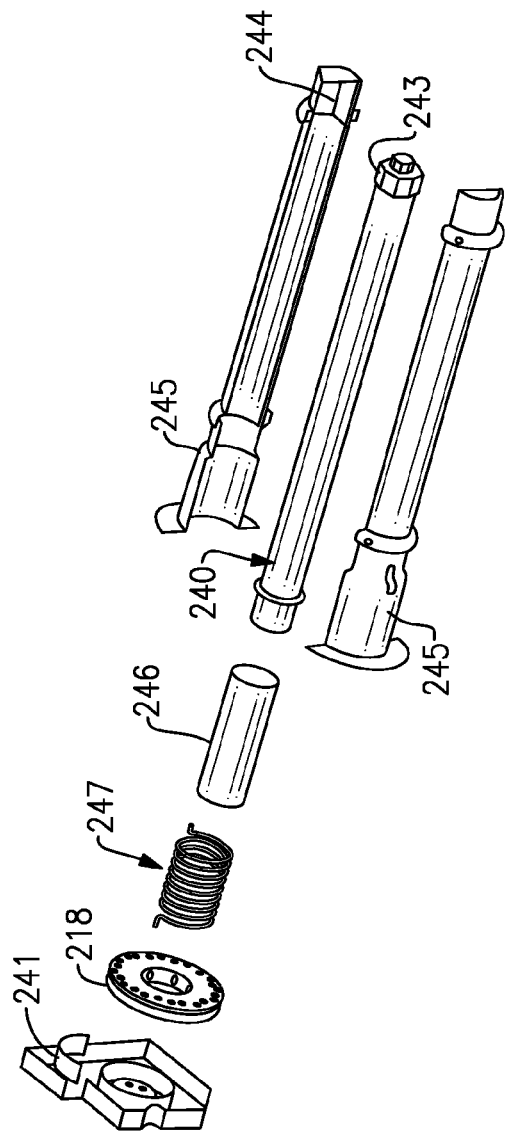
FIG. 34 shows the drive system for the winding shaft according to FIG. 33 in an exploded illustration.

FIGS. 33 and 34 show merely one cable drum 218 on a front end region of the winding shaft 216. The cable drum which lies opposite is arranged in the same way and is in an operative connection with the winding shaft like the cable drum 218 which is shown using FIGS. 217 and 218. The cable drum 218 is mounted rotatably on an end 241 of the cassette housing 208. To this end, the end 241 has a rotary bearing ring (not denoted in greater detail), onto which the cable drum 218 is plugged. In addition, a stator part of a tubular motor 240 is fastened to the end 241, which tubular motor 240 protrudes coaxially into the winding shaft 216 which is designed as a rotationally symmetrical hollow profile. The stator part of the tubular motor 240 is connected fixedly on the end side to the end 241 of the cassette housing 208 via fasteners 242. In addition, the tubular motor 240 has a rotor part which is mounted in the stator part such that it can be rotated coaxially with respect to the rotational axis of the winding shaft and has a torque transmission section 243 which protrudes axially to the outside beyond the stator part and is connected in a rotationally locking manner to a motor housing 245. The rotationally locking connection of the torque transmission section 243 of the rotor part of the tubular motor 240 to the motor housing 245 takes place via a polygonal hollow profile section 244 of the motor housing 245, which hollow profile section 244 is adapted to the torque transmission section 243. The motor housing 245 is of two-shell construction, in order for it to be possible to achieve simple mounting and dismantling relative to the stator part and to the torque transmission section 243 of the tubular motor 240. Accordingly, the motor housing 245 is mounted rotatably relative to the stator part of the tubular motor 240. On its outer shell, the motor housing 245 is provided with integrally formed bearing rings which support the winding shaft 216 radially on the inside. In addition, the motor housing 245 has a cylindrical plug-in section which further assists a non-positive connection of an inner shell of the winding shaft 216 to the motor housing 245. Accordingly, the winding shaft 216 is connected in a rotationally locking manner to the motor housing 245.

A supporting tube 246 is pushed onto the tubular motor 240 on a front end region of the tubular motor 240, which front end region faces the end 241, on which supporting tube 246 a differential coil spring 247 in the form of a helical spring is arranged coaxially. The differential coil spring 247 is connected with one spring end to the motor housing 245 in a rotationally locking manner. The motor housing 245 surrounds the differential coil spring 245 coaxially on the outer side, whereas inner-side support takes place by way of the supporting tube 246. An opposite spring end of the differential coil spring 247 is connected to the cable drum 248 in a rotationally locking manner.

The cable drum 218 (not shown) which lies opposite on the end side is in an operative connection in the same way via a differential coil spring with the winding shaft 216, with the result that different rotational speeds between the cable drums 218 and the winding shaft 216 and, at the same time, stressing or relieving of the respective differential coil spring 247 can be achieved. Accordingly, the differential coil springs 247 make it possible to compensate for different circumferential speeds between the respective outer-side winding layers of the flexible cover 207 depending firstly on the winding or unwinding state and secondly on the rotational movement of the cable drums. The motor housing 245 and the winding shaft 216 are connected to one another merely in a non-positive manner in the circumferential direction, with the result that slipping between the winding shaft 216 and the motor housing 245 is also made possible as soon as excessively high loads occur on the winding shaft 216. The tubular motor 240 is an electric motor and is supplied with electrical power via current and control lines which are not denoted in greater detail, and is controlled in a suitable way via an electric or electronic control unit. The tubular motor 240 can be rotated in both rotational directions, with the result that the winding shaft 216 can be loaded by the tubular motor 240 both in the winding direction and in the unwinding direction.

Figure 35A:
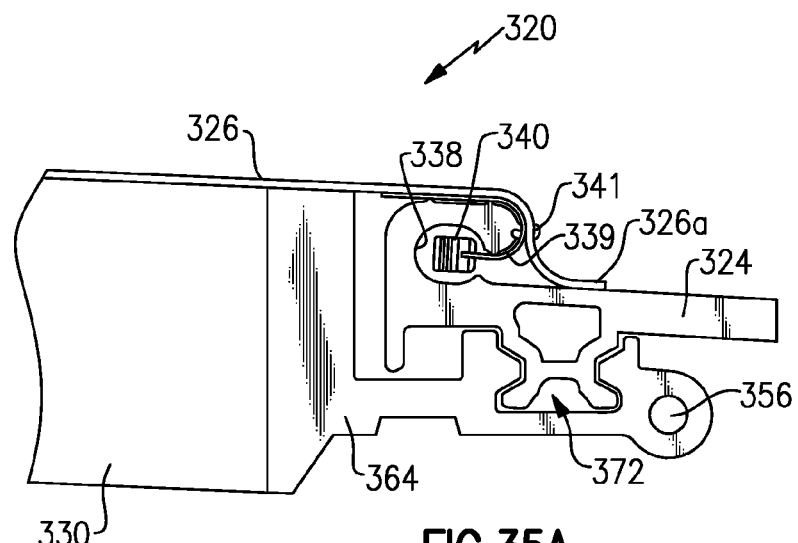
FIG. 35A is a cross-sectional view of another guide rail arrangement and cover retainer configuration.
Figure 35B:
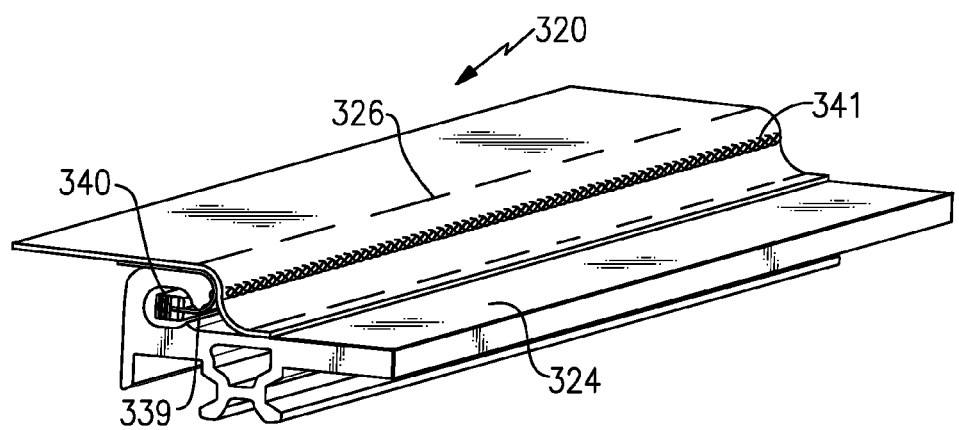
FIG. 35B is a perspective end view of the guide rail arrangement shown in FIG. 35A.
Figure 35C:
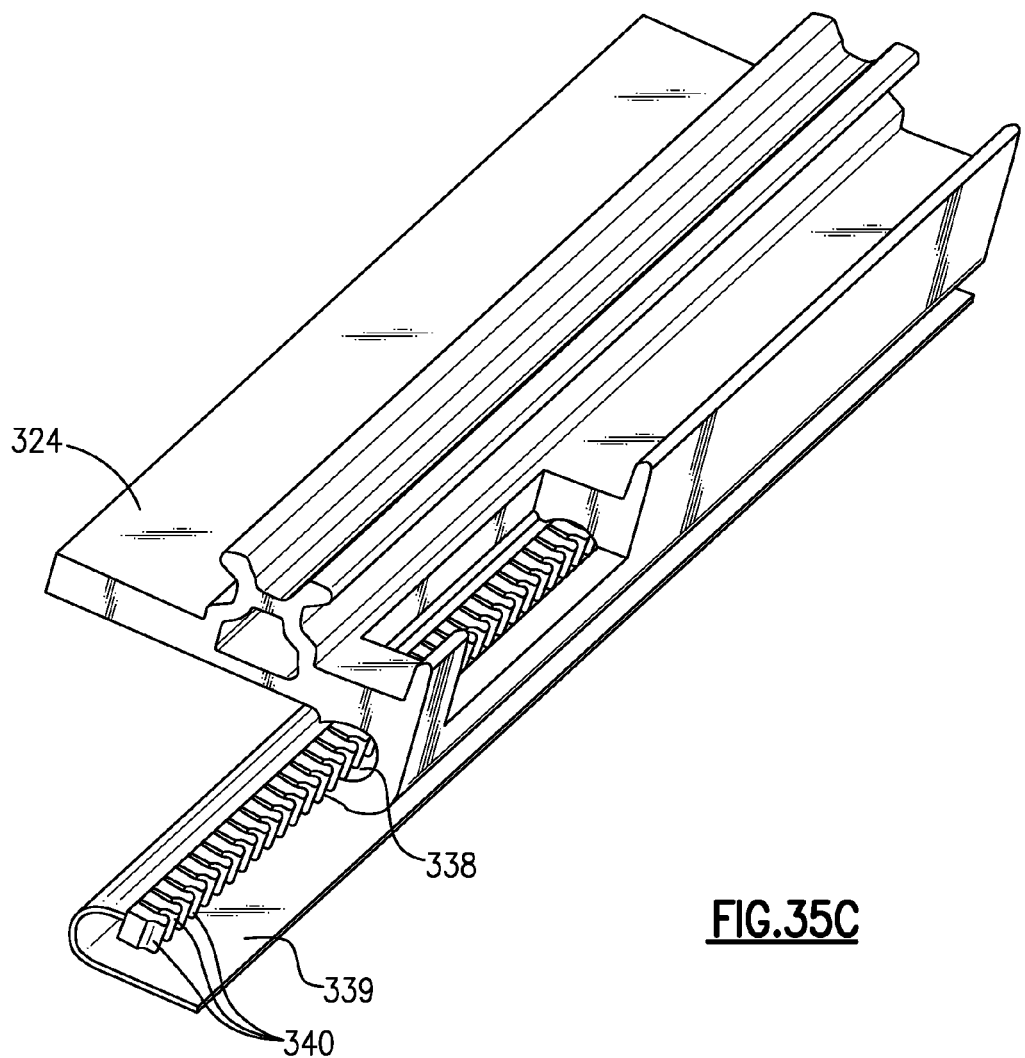
FIG. 35C is a bottom perspective view of the guide rail arrangement shown in FIG. 35B with the cover and retainer partially exposed.

FIGS. 35A-35C illustrate another example cover system 320. The cover system 320 includes guide rails 324 (one shown) that supports a cover 326. The cover 326 includes a flap 339 secured near an end 326a by stitching 341 or other suitable attachment element. The retainers 340 are secured to an edge of the flap 339, which is curled inward, for example, about 180°, and received in the track 338. The retainers 340 are configured similar to a zipper in which numerous discrete elements are spaced apart from one another to permit the flap 339 to flex during operation. The end 326a extends outward and beyond the flap 339 where it rides along an upper surface of the guide rail 324 to enclose the track 338 and prevent debris from entering clogging the interface between the retainer 340 and the track 338.

Another track 372 is arranged on an under or lower side of the guide rail 324 along which ends 364 of the bows 330 travel during operation. The interface between the ends 364 and tracks 372 are protected from debris at this interior location.

Figure 36:
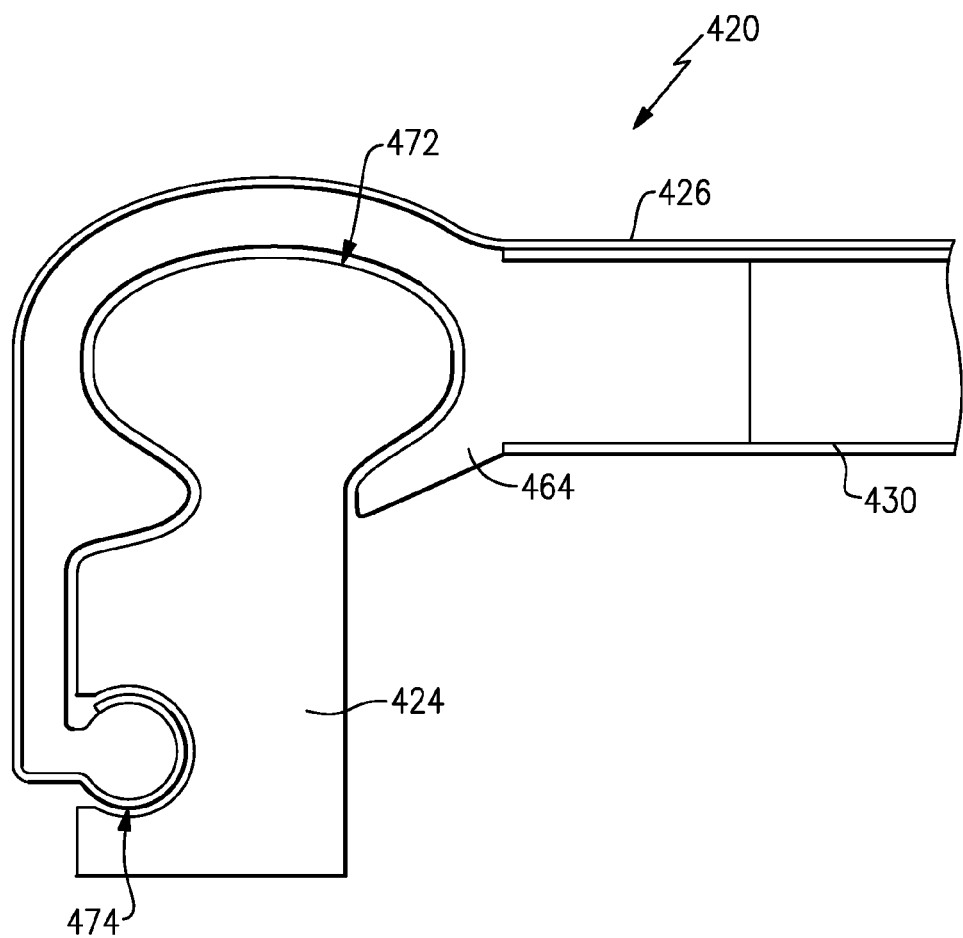
FIG. 36 is a cross-sectional view of yet another guide rail arrangement.

Another cover system 420 is illustrated in FIG. 36. In this arrangement, the ends 464 (one shown) that carry the bows 430 ride along a track 472 on an upper side of the guide rail 424. The cover 426 extends about the outer surface of the end 464 and is received in another track 474 in the guide rail 424. In this manner, the end 464 and end of the cover 426 wraps about the guide rail 426 to keep debris from the tracks 472, 474.

Figure 37B:
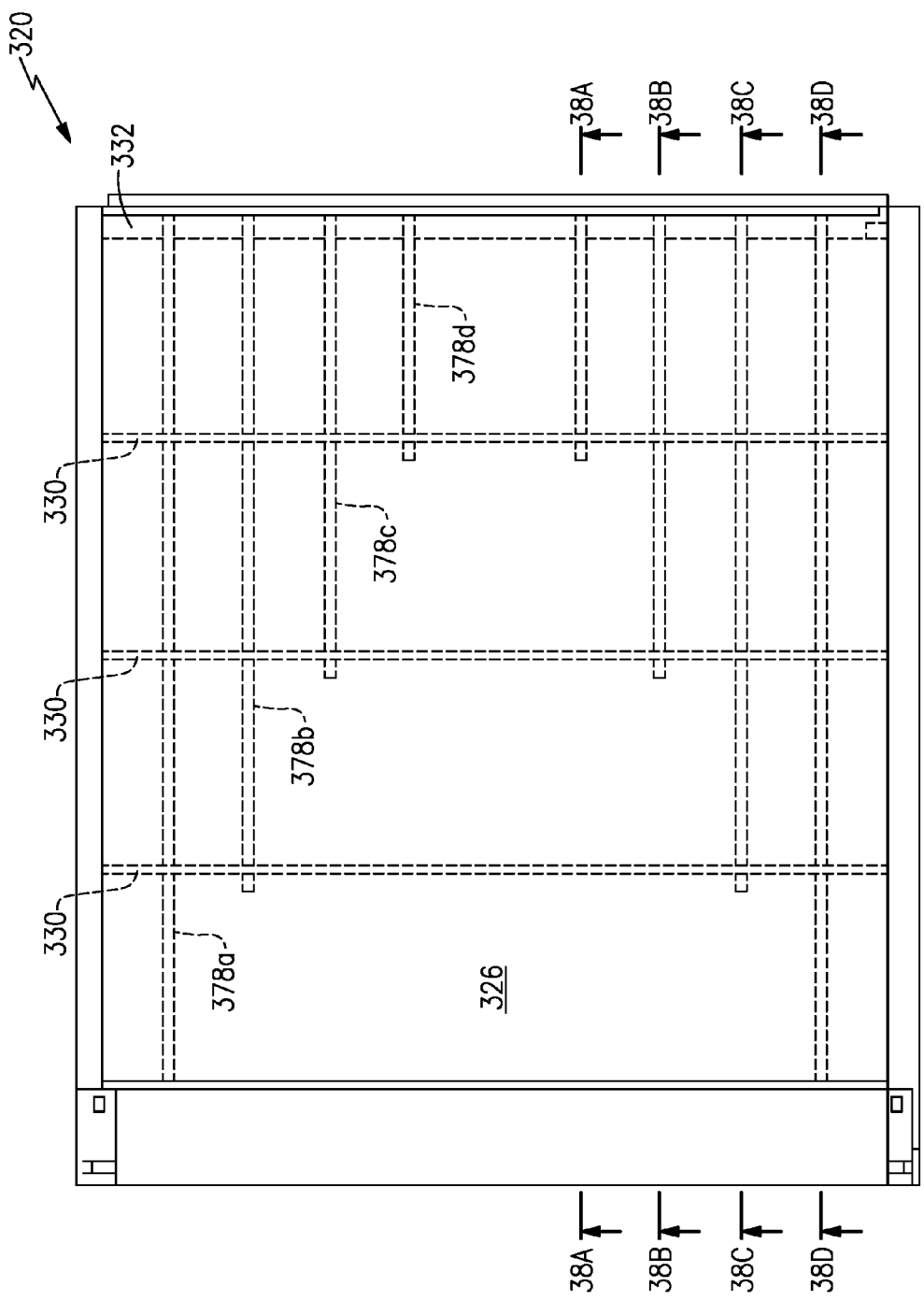
FIG. 37B is a plan view of the tether arrangement and cover shown in FIG. 37A.
Figure 38A:
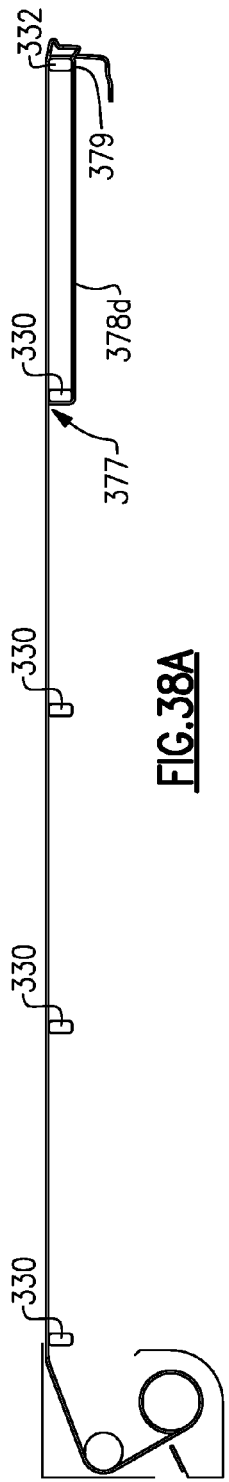
FIG. 38A is a cross-sectional view through the cover system shown in FIG. 37A taken along line 38A-38A.
Figure 38B:
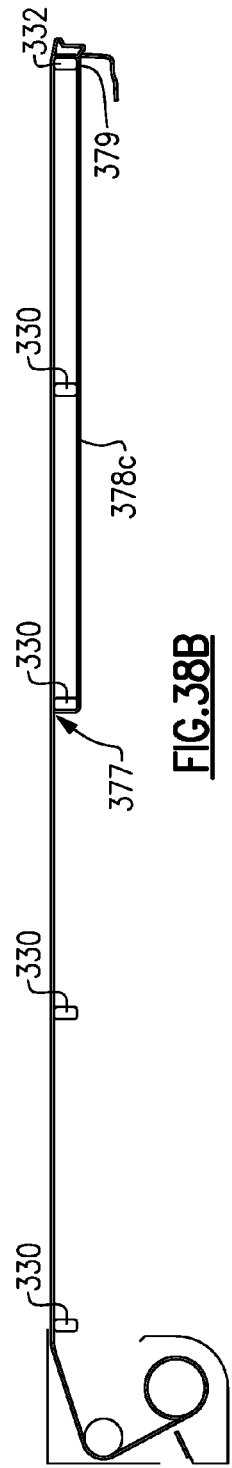
FIG. 38B is a cross-sectional view through the cover system shown in FIG. 37A taken along line 38B-38B.
Figure 38C:
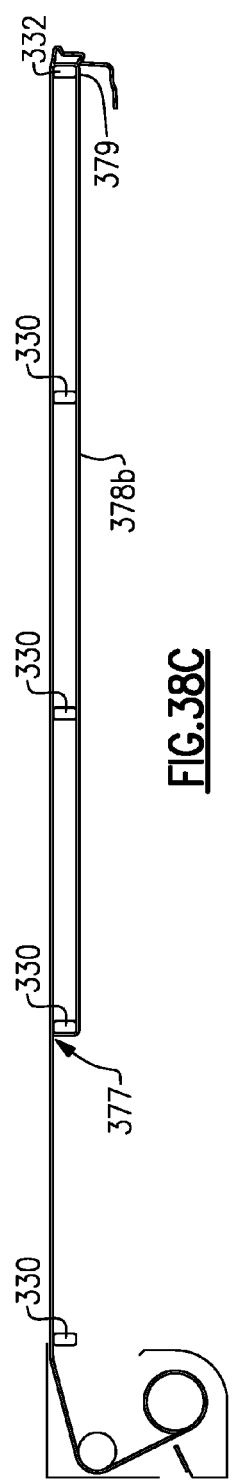
FIG. 38C is a cross-sectional view through the cover system shown in FIG. 37A taken along line 38C-38C.
Figure 38D:
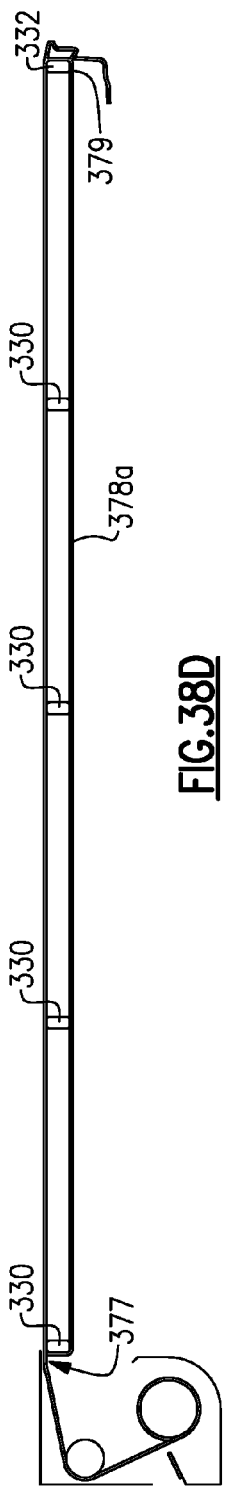
FIG. 38D is a cross-sectional view through the cover system shown in FIG. 37A taken along line 38D-38D.

Another tether arrangement for the cover system 320 is shown in more detail in FIGS. 37A-39C. The cover 326 is shown in an extended/closed position in FIGS. 37A and 37B with the bows 330, 332 and tethers 378a-378d illustrated in phantom. As shown in FIG. 37A, one or more motors 348 may be positioned beneath the cassette housing 342 rather than contained within the cassette housing. Retainer guides 343 reposition the retainers 340 (FIGS. 35A-35C) between the curled configuration in the guide rails 324 to a flat orientation suitable for wrapping about the main roller.

Different length tethers 378a-378d (collectively, "378") are secured to the last bow 332 by second ends 379 and to the underside of the cover 326 by first ends 377 at a location forward of each of the bows 330, for example, by stitching or glue. In one example, the tethers 378 are constructed from a nylon fabric. As the cover 326 is extended to the closed position, the tethers 378 drag the bows 330, 332 to the desired spacing (shown in FIGS. 38A, 38B and 39A), ultimately abutting a forward face of the bows 330. As the cover 326 is moved to the open position, shown in FIGS. 39B and 39C, the cover 326 pulls the bows forward along the guide rails 324 toward the stowed position.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A retractable cover system comprising:
a frame that provides an opening and includes laterally spaced apart guide rails;
a drive system;
a flexible cover has laterally opposing edge portions with intermittent retainers received in the guide rails, the retainers configured to slide relative to the guide rails between first and second positions within the opening in response to actuation of the drive system; and
multiple spaced apart bows extending laterally between guide rails, the bows provide a laterally and outwardly extending arc that maintains tension on the flexible cover laterally between the retainers, wherein each edge portion includes longitudinally spaced perforations with one of the retainers extending therethrough, each retainer includes first and second retainer portions secured to one another and respectively arranged on first and second sides of the flexible cover.

2. The retractable cover system according to claim 1, wherein each guide rail includes a structural section and a covering section secured to the structural section, a first track provided between the structural section and the covering section, the retainers received in the first track.

3. The retractable cover system according to claim 2, wherein the structural section includes first, second and third walls that extend from an upper side of the structural section, the first wall provides the first lip, the second and third walls include openings to fluidly connect the first track with an outer edge of the structural section.

4. The retractable cover system according to claim 3, wherein the third wall and an end of the covering section include removably interlocking features, and a threaded fastener secures the covering section to the second wall.

5. The retractable cover system according to claim 1, wherein the structural section and the covering section respectively include first and second lips that provide a gap through which the flexible cover extends, the first and second retainer portions are configured to slide respectively on the first and second lips with the flexible cover under tension.

6. A retractable cover system comprising:
a frame that provides an opening and includes laterally spaced apart guide rails;
a drive system;
a flexible cover has laterally opposing edge portions with intermittent retainers received in the guide rails, the retainers configured to slide relative to the guide rails between first and second positions within the opening in response to actuation of the drive system; and
multiple spaced apart bows extending laterally between guide rails, the bows provide a laterally and outwardly extending arc that maintains tension on the flexible cover laterally between the retainers, wherein a flap is secured to the cover and provides the edge portions, the flap wraps about an upper side of the guide rail, and an end of the cover extends beyond the flap to an upper surface of the guide rail to enclose the retainers and the track.

7. The retractable cover system according to claim 6, wherein the retainers are arranged in a zipper-like configuration and are received in a track.

8. The retractable cover system according to claim 6, wherein the multiple bows includes a last bow to which an end of the flexible cover is secured, and the multiple bows include remaining bows that are unsecured to the flexible cover.

9. The retractable cover system according to claim 8, wherein a seal is mounted to the last bow and is configured to seal against a truck bed gate.

10. The retractable cover system according to claim 8, wherein the guide rails include a second track slidably supporting the bows.

11. The retractable cover system according to claim 6, wherein the drive system includes a cassette housing, and a drain is provided in the cassette housing.

12. The retractable cover system according to claim 11, wherein the drive system includes a wiper that engages the flexible cover and is configured to remove debris.

13. The retractable cover system according to claim 11, wherein the cassette housing is configured to be arranged in a pocket provided by the truck bed, the drain arranged at an exterior of the truck bed.

14. The retractable cover system according to claim 6, wherein the drive system includes a main roller about which the flexible cover is wrapped and unwrapped, and one end of the flexible cover is secured to the main roller by an omega lock configuration.

* * * * *